(12) United States Patent
Abu-Ageel

(10) Patent No.: US 6,757,092 B2
(45) Date of Patent: Jun. 29, 2004

(54) MICRO-MACHINE ELECTROSTATIC ACTUATOR, METHOD AND SYSTEM EMPLOYING SAME, AND FABRICATION METHODS THEREOF

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 16 days.

(21) Appl. No.: 10/315,366

(22) Filed: Dec. 10, 2002

(65) Prior Publication Data

US 2003/0123124 A1 Jul. 3, 2003

Related U.S. Application Data

(60) Provisional application No. 60/338,917, filed on Dec. 10, 2001, and provisional application No. 60/380,250, filed on May 13, 2002.

(51) Int. Cl.[7] .......................... G02B 26/00; H01L 29/84; H01L 21/00
(52) U.S. Cl. .......................... 359/290; 257/414; 438/52
(58) Field of Search .......................... 359/290; 257/414; 438/52

(56) References Cited

U.S. PATENT DOCUMENTS

| | | | |
|---|---|---|---|
| 5,969,848 A | 10/1999 | Lee et al. | 359/298 |
| 6,497,141 B1 * | 12/2002 | Turner et al. | 73/105 |
| 6,612,029 B2 * | 9/2003 | Behin et al. | 29/847 |

FOREIGN PATENT DOCUMENTS

| | | |
|---|---|---|
| WO | WO 01/73934 A2 | 10/2001 |
| WO | WO 01/73935 A2 | 10/2001 |
| WO | WO 01/73936 A2 | 10/2001 |
| WO | WO 01/73937 A2 | 10/2001 |
| WO | WO 01/74707 A2 | 10/2001 |
| WO | WO 01/76055 A2 | 10/2001 |

* cited by examiner

Primary Examiner—Hung Xuan Dang
Assistant Examiner—Tuyen Tra
(74) Attorney, Agent, or Firm—Howrey Simon Arnold & White, LLP; Michael K. Lindsey, Esq.

(57) ABSTRACT

A comb-drive actuator includes a stationary comb structure having stationary comb fingers interdigiated with comb fingers of a mobile comb structure. The comb fingers include a p-type layer and an n-type layer forming a diode junction in each finger. The diode junctions of either the stationary comb fingers or the mobile comb finger are reversed biased, while at least one layer of the other set of comb fingers is grounded. This creates an attractive electric field between the sets of fingers, causing the mobile comb structure to move. The mobile comb structure of the actuator can be aligned along the rotational axis of a movable element and attached at one end to the movable element and at the other end to a flexure. The comb fingers can also be shaped to provide multi-gap and/or variable gap configurations between the stationary and mobile comb structures.

40 Claims, 28 Drawing Sheets

MICRO-MACHINE ELECTROSTATIC ACTUATOR, METHOD AND SYSTEM EMPLOYING SAME, AND FABRICATION METHODS THEREOF

CROSS-REFERENCE TO RELATED APPLICATION

This application claims the benefit of prior Provisional Application Nos. 60/338,917 filed Dec. 10, 2001 and 60/380,250 filed on May 13, 2002. Each of these applications is fully incorporated by reference herein as though set forth in full.

TECHNICAL FIELD

The present invention relates generally to micro-electromechanical systems (MEMS), and in particular to MEMS that include torsionally actuated devices employing comb-drive actuators and methods of fabricating and using such actuators and devices.

BACKGROUND

Micro-electromechanical systems (MEMS) technology has been used increasingly in the development of many micro devices such as optical switches. MEMS technology can utilize lithographic mass fabrication processes used by the semiconductor industry in manufacturing integrated circuits (ICs). MEMS based optical switches typically consist of arrays of tiny mirrors and are found in two-dimensional (2D) and three-dimensional (3D) varieties. Two-dimensional MEMS based mirrors only can tilt in two positions, up or down, whereas 3D MEMS based mirrors can tilt in any direction, i.e., up, down or to the sides.

To move the tiny mirrors, comb-drive actuators can be used. Single-layer and staggered vertical comb-drive actuators have been used to produce torsional motion of structures through the application of electrostatic forces. As shown in FIG. 1, comb-drive actuators include two components: a mobile comb-finger structure 309 and a stationary comb-finger structure 312. Each comb structure has a plurality of fingers interdigiated with the other comb structure. By applying a voltage potential across the structures (which are isolated from one another), an electrostatic field is developed between the structures. In one position, the stationary comb-like structure 312 and the mobile comb-like structure 309 partly overlap as shown in FIG. 1. When the potential is applied, the electrostatic field causes the mobile structure 309 to move so as to maximize the overlap between the two comb-finger structures 309, 312.

A single-layer vertical comb-drive actuator is disclosed in U.S. Pat. No. 5,696,848 issued to Lee et al. A staggered vertical comb-drive actuator capable of larger vertical motion compared to single-layer vertical comb-drive actuator is disclosed in international patent publications WO 01/73934 A2, WO 01/73935 A2, WO 01/73936 A2, WO 01/73937 A2, WO 01/74707 A2 and WO 01/76055 A2 to Behin et al.

In the references listed above, the staggered vertical comb-drive actuator provides a larger vertical/rotational motion compared to the single-layer comb-drive actuator. In the single-layer vertical comb-drive actuator, the maximum vertical motion is about 1.5 micrometers resulting in a very small angle of rotation. The single-layer comb-drive actuator consists of a single conducting layer where the mobile comb-like structure is attracted toward the stationary comb-like structure once a bias voltage is applied between them.

The staggered comb-drive actuator consists of two conducting layers separated by an insulating layer or air gap. The top and bottom layers can be biased so that the top layer of the mobile comb-like structure is attracted toward the bottom layer of the stationary comb-like structure thus applying a larger torque on the mobile side. The voltage profile across the staggered actuator depth is uniform within each layer and its value is equal to the biasing voltage. However, the staggered vertical comb-drive actuator lacks the capability to create a non-uniform voltage profile across the actuator depth and to dynamically change such voltage profile across the comb-drive depth during operation. Providing such capability permits more versatile designs with larger vertical/rotational motion. In addition, it is desirable to have a single-layer comb-drive actuator that can provide a larger angle of rotation in comparison to single-layer comb-drive actuators.

Referring to FIG. 1, the vertical comb-drive actuator 313 applies the force directly on a rotating element 302 suspended over a cavity 305 by flexures 307. The comb-drive actuator 313 is located off of the rotational axis of the element 302 by a distance R. In this example, the vertical height d (i.e. depth) of the staggered comb-drive actuator 313 depends on both the angle of rotation $\alpha$, the actuator length L 316, and the distance R 315 between the mobile comb-like structure 309 and the flexures 307. Specifically, the comb height must be larger than $(L+R).\tan(\alpha)$ assuming that there is enough torque available to achieve the desired angle of rotation $\alpha$. Increasing R results in a larger torque applied on the mobile comb-like structure 309. Thus, relatively large and massive comb-drive actuators are needed for large angles of rotation.

This leads to some potential drawbacks. First, a large comb-drive actuator can lead to lower resonance frequency. Further, as the height of the comb drive increases the width of comb fingers as well as the gap between adjacent mobile and stationary comb fingers have to be increased accordingly due to the limited verticality (typically 90±0.5 degrees) of the deep reactive ion etch (RIE) process, usually used to create such structures. The increased gap leads to a smaller force exerted by each stationary comb finger 311 on the corresponding mobile comb finger 308 and results in smaller capacitance values between mobile 308 and stationary 311 comb fingers. The smaller capacitance leads to position sensors of lower accuracy and/or more complicated measurement techniques of capacitance.

In addition, this larger gap and wider comb fingers lead to a smaller number of comb fingers that can be formed in a given space resulting in a further reduction in the overall torque acting on the mobile comb-like structure 309. Thus, a smaller angle of rotation is achieved or higher voltage is needed to maintain the desired angle of rotation. These conflicting performance and size demands are inherent to the vertical comb-drive actuator 313.

Therefore, there is a need for new types of rotating comb-drive actuators and torsional micro-mirror systems that improve on known actuators and systems in terms of smaller size, higher resonant frequency, larger angle of rotation, lower actuation voltage, more precise position sensing, and simpler fabrication methods.

SUMMARY

It is an advantage of the present invention to provide an improved comb-drive actuator and system employing the same. It is a further advantage of the invention to provide a smaller size rotating vertical comb-drive actuator with higher resonance frequency, larger angle of rotation, lower actuation voltage and/or more precise position sensors with less complex measurement schemes.

In accordance with an embodiment of the invention, a pn-based vertical comb-drive actuator includes a p-type semiconducting layer on top of a n-type semiconducting layer or vice versa. The stationary and mobile comb-like structures have the same pn-structure. The pn-structure in the stationary comb-like structure is reverse biased. Whereas in the mobile comb-like structure, either the n-type or p-type layer is grounded in order to establish an electric field between the opposite semiconducting types of the stationary and mobile comb-like structures. This causes the stationary comb-like structure to apply a torque on the mobile comb-like structure resulting in a vertical and/or rotational motion.

In accordance with another embodiment of the invention, an improved actuator system is achieved by applying the torque directly on the flexures suspending a torsional element over a cavity, rather than applying such torque on the torsional element itself at an off-axis location.

Other embodiments of the invention provide uni-axial and multi-axial systems employing comb-drive actuators, as well as fabrication methods and operational procedures for the actuators, position sensors, and systems.

Other embodiments, features and advantages of the invention will be or will become apparent to one with skill in the art upon examination of the following figures and detailed description. It is intended that all such additional features, embodiments and advantages be included within this description, be within the scope of the invention, and be protected by the accompanying claims.

It is to be understood that the drawings are solely for purposes of illustration and not as a definition of the limits of the disclosure. Furthermore, it is to be understood that the drawings are not necessarily drawn to scale and that, unless otherwise stated, they are merely intended to conceptually illustrate the structures and methods described herein.

DETAILED DESCRIPTION OF THE PRESENTLY PREFERRED EMBODIMENTS

Described herein are: a pn-based vertical comb-drive actuator, a multi-gap comb-drive actuator, a variable-gap comb-drive actuator, a vertical comb-drive actuator with enhanced performance, a position sensor, a micro-mirror system and fabrication methods of such actuators, position sensor and micro-mirror system.

Figure 2A:
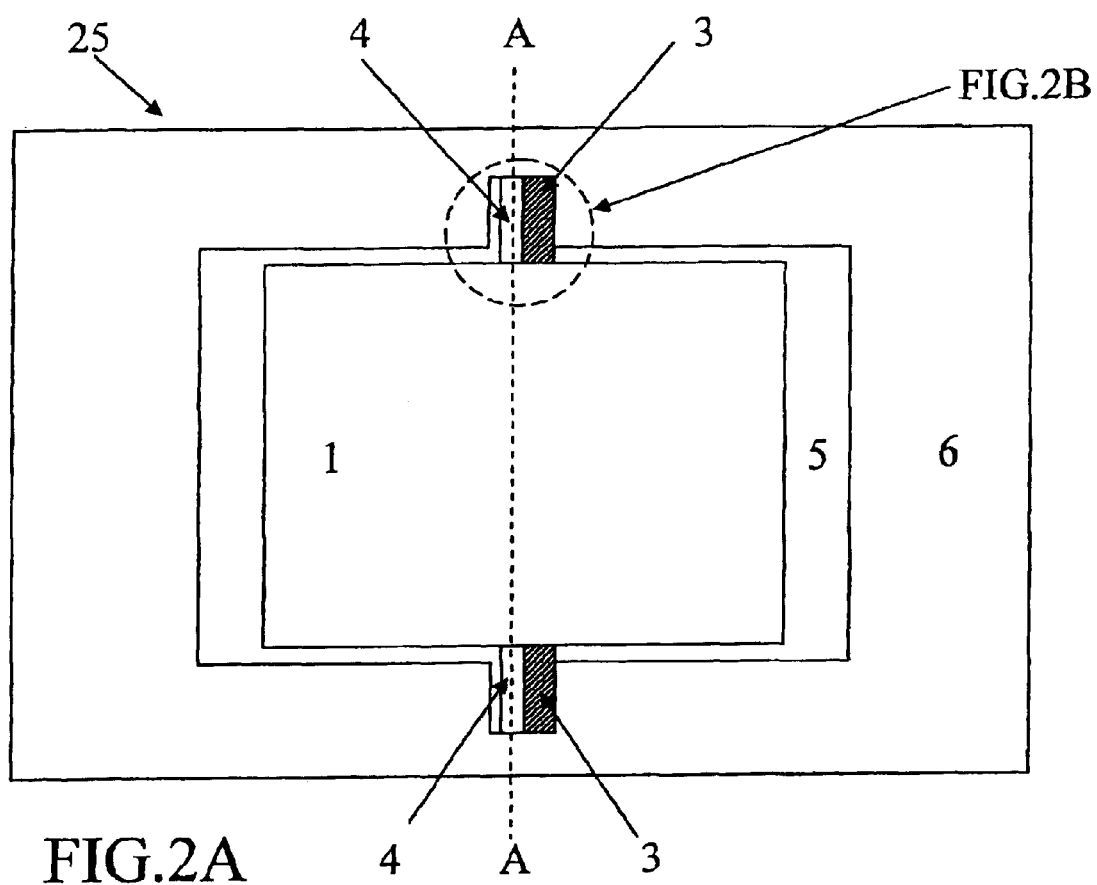
FIGS. 2A–2D show simplified plan, cross-sectional and perspective views of a torsional micro-mirror system with a pn-based comb drive actuator acting directly on the flexures in accordance with an embodiment of the invention.
Figure 2B:
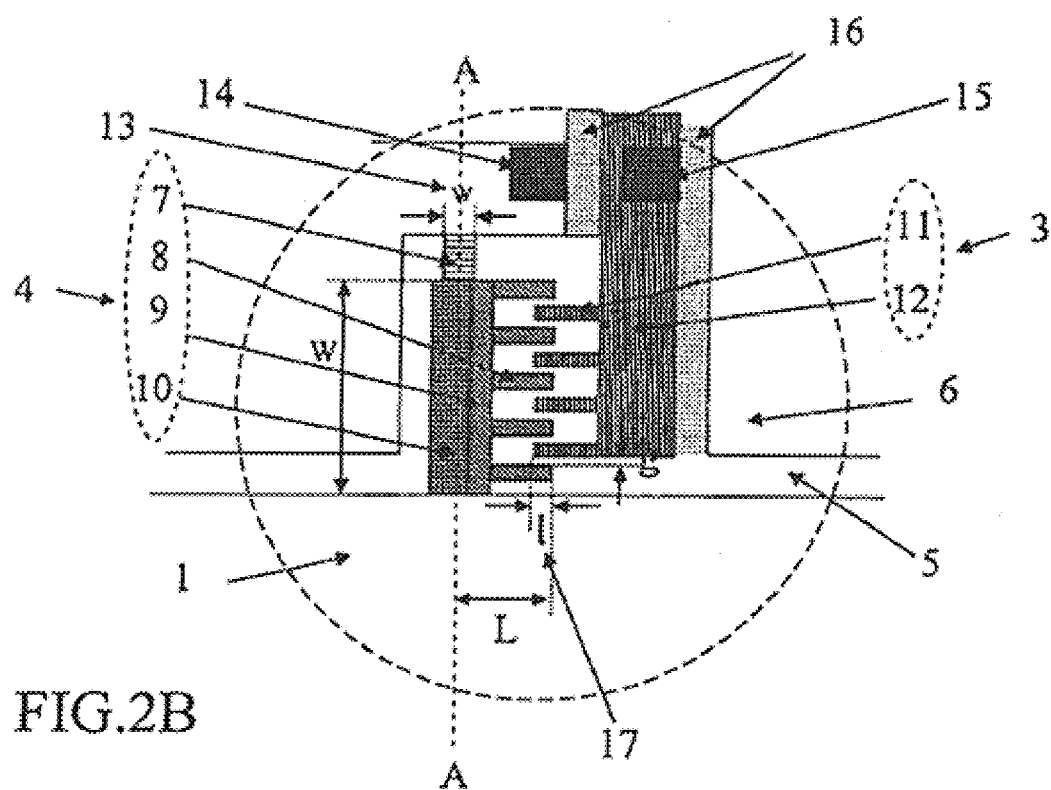
Figure 2C:
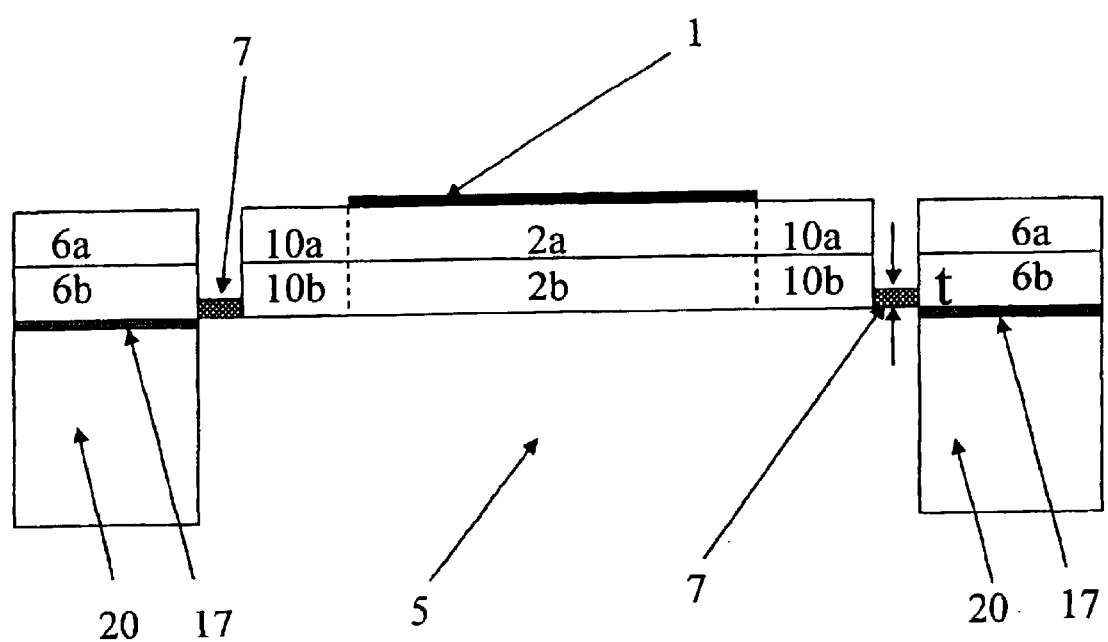

FIG. 2A shows a plan view of one embodiment of a torsional micro-mirror system 25. FIG. 2B shows an enlargement of both the flexure and the mobile comb-like structure 4 as well as the stationary comb-like structure 3, which are encircled in FIG. 2A. FIG. 2C shows a cross section view of FIG. 2A taken along the centerline A. In this embodiment, a stationary comb-like structure 3 is attached to a substrate 20 as shown in FIG. 2C and contains stationary comb fingers 11 interdigitated with mobile comb fingers 8, which are part of a mobile comb-like structure 9. The mobile comb-like structure 9 is attached to flexures 7 on one side and to a rotating element 2 on the other side. The other ends of the torsional flexures 7 are attached to a base 6. Both the rotating element 2 and the mobile comb-like structure 9 are suspended over a cavity 5 by torsional flexures 7. A cavity 5 is formed in the base 6 below and around both the rotating element 2, mobile comb-like structure 9 and the flexures 7 in order to permit the rotation of the mirror 1, the rotating element 2, mobile comb-like structure 9, and flexures 7 about the flexures axis A. The flexures 7 are necked down to a width w 13 (FIG. 2B) and thickness t (FIG. 2C). These necked down flexures 7 reduce the flexures 7 stiffness, which in turn increases the angle of rotation for a given torque exerted on the flexures 7 by the stationary comb-like structure 3. On the other hand, reducing flexures 7 stiffness leads to a lower resonance frequency, thus, a lower switching speed. The flexures 7 may be collinear and aligned with the rotating element 2 centerline A. Metal pads 14 for the mobile comb-like structure 9 and metal pads 15 for the stationary comb-like structure 12 are provided. These pads 14 and 15 as well as the comb-like structures 9 and 12 are isolated from the substrate 20 by an insulating layer 17. Both mobile comb-like structure 9 and its metal pads 14 are isolated from both stationary comb-like structure 12 and its metal pads 15 by an insulating air gap 16. The rotating element 2, flexures 7, base 6, and comb-like structures 9 and 12 may be made of silicon. A reflective layer such as gold or aluminum can be deposited on top of a rotating element 2 to form a mirror 1. Deposition techniques such as sputtering, thermal or e-beam evaporation, plating and/or electroplating can be used to form the reflective mirror 1. The rotating element 2 and mirror 1 may have various shapes such as rectangular, square, round, and octagonal. The flexures 7 can have different shapes and sizes to enhance the performance of the micromirror system for a given application. Flexures 7 can be, for example, torsion flexures, serpentine flexures, cantilever flexures, or one or more springs combined with pin-and-staple flexures.

Figure 1:
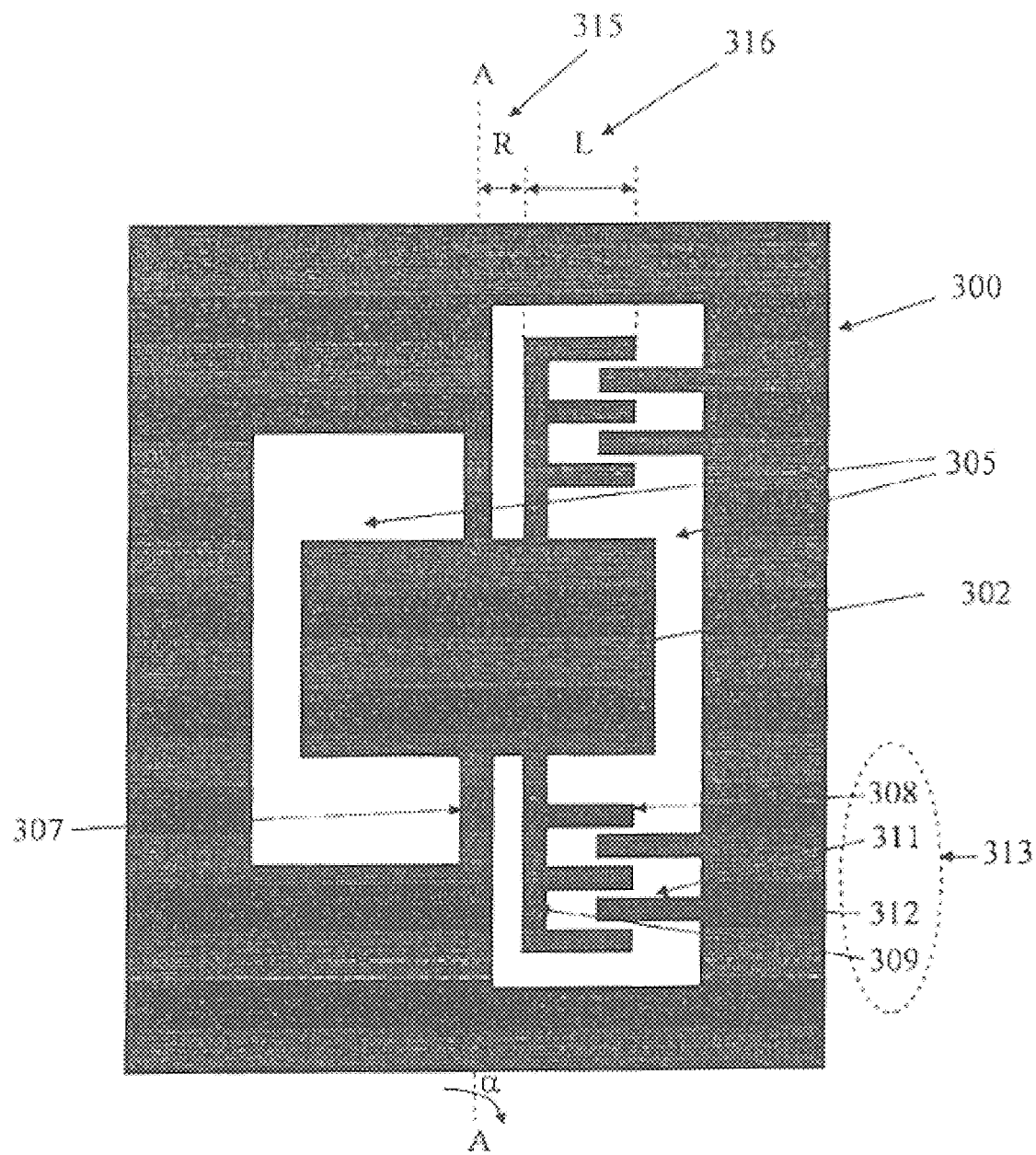
FIG. 1 shows a schematic diagram of a prior art torsional comb-drive actuator.
Figure 2D:
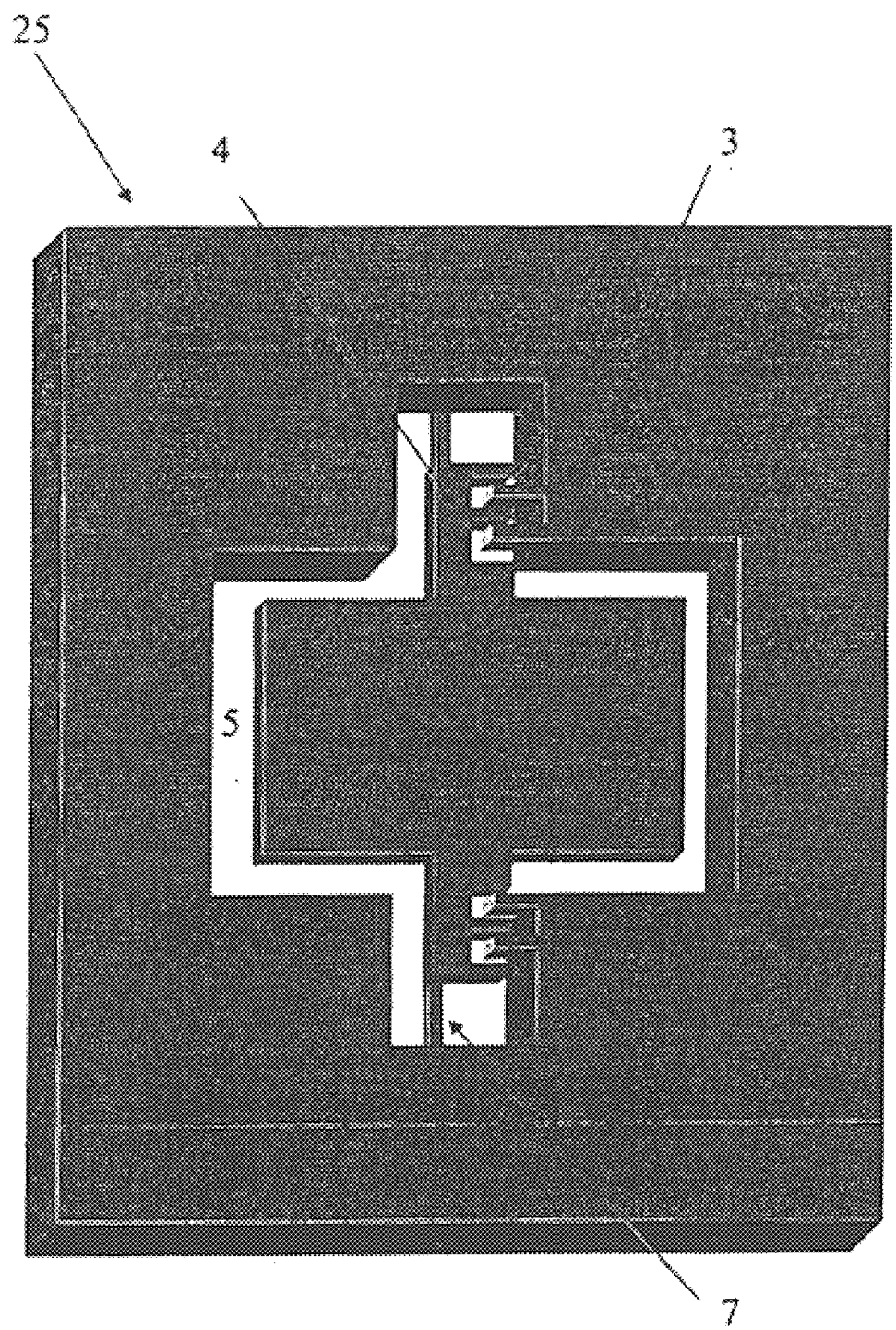

The enhanced comb-drive actuator 3 and 4 of this invention applies torque directly to the flexures 7 as shown in FIGS. 2A–2B, whereas known comb-drive actuators 313 apply torque to the rotating element 302 as shown in FIG. 1. FIG. 2D shows a perspective view of the actuator 3 and 4 of FIG. 2A. In known actuators, the vertical height d (i.e. depth) of a comb-drive structure depends on both the angle of rotation $\alpha$, the mobile comb-like structure 309 length L 316 and the distance R 315 between the mobile comb-like structure 309 and flexures axis A as shown in FIG. 1. The comb height must be larger than $(L+R) \cdot \tan(\alpha)$ assuming that there is enough torque available to achieve the desired angle of rotation $\alpha$. By increasing R 315, the torque on the flexures 307 increases, which is desirable. On the other hand, increasing R 315 means very large and massive comb-drive actuators 313 are needed for large angles of rotation $\alpha$.

In contrast to known actuators, the mobile comb-like structure 9 acts directly on flexures 7 (FIGS. 2A–2B), thus, the required comb height becomes $L \cdot \tan(\alpha)$ and the reduction in the applied torque is compensated for by the higher density of comb fingers as explained below. Actuator 3 and 4 height d in this case can be much smaller than the thickness of the rotating element 2. As the height of the comb drive 3 and 4 decreases the width of comb fingers as well as the gap g between adjacent mobile 8 and stationary 11 comb fingers can be decreased accordingly. This is due to the limited verticality (typically 90±0.5 degrees) of the typical etch mechanisms such as deep reactive ion etch (RIE) process. The reduced gap g and the reduced finger width lead to higher comb finger density (i.e. comb fingers per unit area), which in turn leads to a larger torque exerted by the stationary comb-like structure 12 on the mobile comb-like structure 9. Furthermore, the force exerted by each stationary comb finger 11 on the corresponding mobile comb finger 8 is increased due to the reduced gap g between them. In the vertical comb drive actuator, this force F is directly proportional to $(\epsilon 1 V^2)/g$, where $\epsilon$ is the dielectric constant of the material filling the gap between mobile 8 and stationary 11 comb fingers, 1 is the length of the overlap area between mobile 8 and stationary 11 comb fingers, g is the gap size and V is the applied voltage between mobile 8 and stationary 11 comb fingers.

The enhanced comb-drive actuator 3 and 4 of this invention has four key advantages. First, reducing the size of the comb-drive actuator 3 and 4 in terms of length L, width W and depth d. Thus, leading to a switch with smaller size, which in turn leads to a switch array with smaller size. As the switch array size is reduced, the angle of rotation required to cover the whole array is also reduced. Second, smaller size actuators lead to higher resonance frequency thus faster switching speed. Third, a reduced gap between mobile 8 and stationary 11 comb fingers coupled with a higher density of comb fingers allows the application of a higher torque, which in turn leads to a higher angle of rotation and/or a lower actuation voltage. Fourth, a reduced gap between mobile 8 and stationary 11 comb fingers leads to large capacitance values, which translate to higher accuracy in capacitance measurements through less complicated measurement schemes. This leads to more precise position sensors, which can be employed to precisely control the mirror's 1 angle of rotation $\alpha$ through a feedback system. The advantages of the enhanced comb-drive actuator 3 and 4 may be applied to various types of comb-drive actuators including known actuators.

Figure 3:
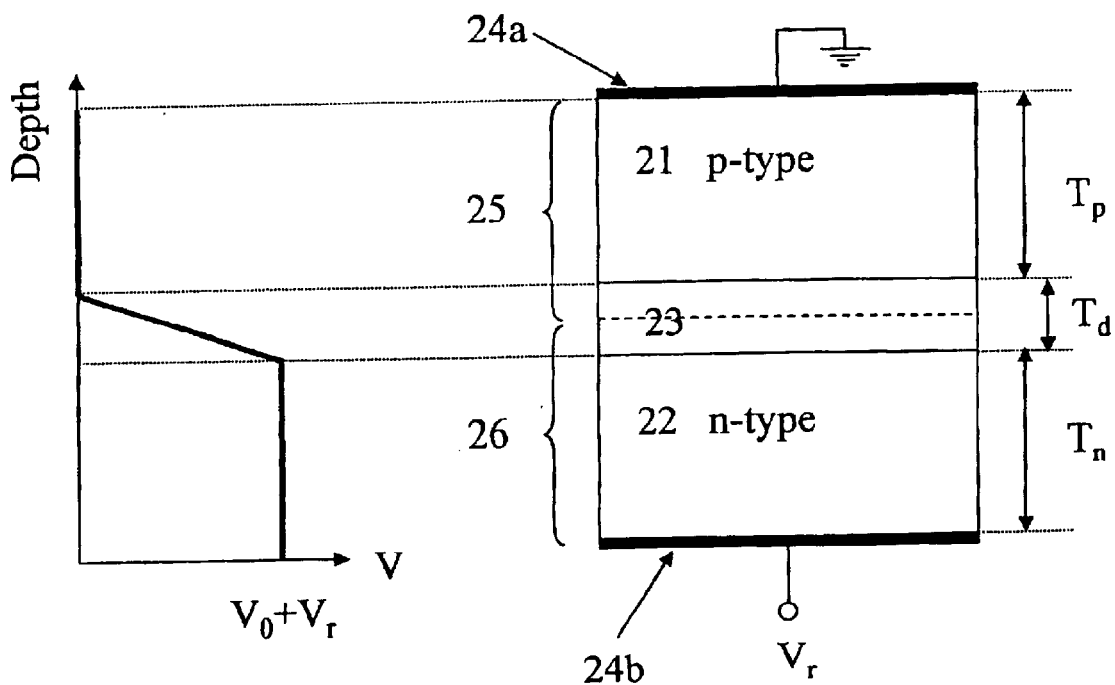
FIG. 3 shows a reverse biased pn-structure with the corresponding voltage profile across its depth.

In another embodiment, a pn-based comb-drive actuator is used to apply force directly on the flexures 7, thus, leading to the rotation of the mirror 1 and the rotating element 2. In this embodiment, a pn-based comb-drive actuator is formed on a substrate 20 and acts directly on flexures 7 as shown in FIGS. 2A–2C. A stationary comb-like structure 3 is attached to a substrate 20 and contains stationary comb fingers 11 (FIG. 2B). Both the stationary comb-like structure 3 and its comb fingers 11 have a p-type layer 21 on top of a n-type layer 22 as shown in FIG. 3. A mobile comb-drive structure 9 is attached to flexures 7 at one side and to a rotating element 2 at the other side. Both the mobile comb-drive structure 9 and its comb fingers 8 have a p-type layer 21 on top of a n-type layer 22 as shown in FIG. 3. The stationary comb fingers 11 may interdigitate with the mobile comb fingers 8. The stationary comb-like structure 3 and its comb fingers 11 are electrically isolated from the mobile comb-like structure 9 and its comb fingers 8 by an insulating air gap. Both stationary 3 and mobile 4 comb-like structures are electrically isolated from the substrate 20 by an insulating layer 17 such as silicon oxide, reverse biased pn-junction or an insulating air gap. The actuator layer arrangement is not limited to a pn-structure and may consist of an intrinsic semiconducting layer sandwiched between a p-type semiconducting layer and a n-type semiconducting layer (PIN-structure) or a metal-oxide-semiconductor (MOS) structure. It also may consist of a graded pn-structure or multiple stacks of pn- and/or pin-structures or any other combinations. The p-type layer 21 and n-type layer 22 in the stationary comb-like structure may have different depths and layer arrangements from these ones in the mobile comb-drive structure 9.

The flexures 7 may have various designs and shapes. For example, the flexures 7 may be rectangular flexures, I-shaped cross-section, T-shaped cross-section, torsion flexures, serpentine flexures, cantilever flexures, or one or more springs combined with pin-and-staple flexures. The restoring torque that counters the rotation of the rotating element 2 may be provided by the torsional stiffness of the flexures 7 or by the application of a counter force on the rotating element 2. For example, this force can be electrostatic, electromagnetic or piezoelectric force.

As shown in FIG. 3, when a p-type semiconducting layer 25 and n-type semiconducting layer 26 come into contact, a depletion region 23 forms on both sides of the pn junction. This region is depleted of free carriers compared to the bulk p-type region 21 and n-type region 22 on both sides of the junction. An internal built-in potential $V_o$ forms across the depletion region 23. When an external reverse bias voltage $V_r$ larger than zero is applied across the pn-structure through the metal contacts 24 as shown in FIG. 3, the voltage across the depletion region 23 becomes $V_o+V_r$. This voltage starts from zero at the border of the p-type region 21 and increases until it reaches $V_o+V_r$ at the border of the n-type region 22. The voltage across the p-type region 21 is uniform and equal to zero whereas the voltage profile is uniform and equal to $V_o+V_r$ across the n-type region 22. As the reverse bias voltage $V_r$ increases, the depth $T_d$ of the depletion region 23 increases whereas both the depth $T_p$ of the p-type region 21 as well as the depth $T_n$ of the n-type region 22 decrease. By reducing the dopant concentration of the n-type region 22, the depletion region 23 can be extended to cover the entire depth of n-type region 22 thus leading to an increasing voltage profile across the bottom layer of the pn-structure. When a positive external voltage $V_f$ is applied to the p-type region 21 and n-type region 22 is grounded, the pn-structure becomes forward biased and the voltage across the depletion region 23 becomes $V_o-V_f$ and the depth of the depletion region 23 decreases. The current across the pn-structure is very high (milliamps range) when the structure is forward biased and depends on $V_f$ whereas the current is very low (microamp range or lower) when the structure is reverse biased and is independent of $V_r$ as long as $V_r$ is lower than the breakdown voltage of the pn-junction.

When the pn-diode across the stationary comb-like structure 3 is reverse biased as shown in FIG. 3 and the p-type region 21 across the mobile comb-like structure 9 is grounded, an electric field is established between the p-type region 21 of the mobile comb fingers 8 on one side and both the depletion region 23 and the n-type region 22 of the stationary comb fingers 11. Thus, the mobile comb-like structure 9 is attracted toward the stationary comb-like structure 3 causing the rotating element 2 to rotate about axis A. Grounding the p-type region 21 across the mobile comb-like structure 9 and its comb fingers 8 does not lead to grounding the n-type region 22 of the mobile comb-like structure 9 and its comb fingers 8 due to the existence of the built-in potential across the pn-junction. Grounding both the n-type and p-type layers of the mobile comb-like structure 9 is possible and leads to the movement of the mobile comb-like structure 9 toward the stationary comb-like structure 3. This mode of operation is given as an example to explain the operation of the actuator and other modes of operation can be used. The resonant motion of the actuator may be excited by the application of a periodic potential near or at the resonant frequency of the actuator.

The key advantages of a pn-based vertical comb-drive actuator over single and staggered vertical comb-drive actuators are as follows. First, a pn-based vertical comb-drive actuator provides a non-uniform voltage profile across the actuator depth compared to a uniform voltage profile across the depth of single and staggered actuators. The operational effects of this non-uniform voltage profile become more pronounced as the depth of a comb-drive actuator becomes comparable to the depletion region depth. The application of a pn-based vertical comb-drive actuator directly on the flexures allows having actuators with small depths, thus, permitting the use of the non-uniform voltage profile to its full extent. Second, the depletion region in pn-based vertical comb-drive actuator provides an initial overlap between the grounded p-type region 21 of the mobile comb fingers 8 and depletion region 23 of the stationary comb fingers 11 when the pn-structure in stationary comb-like structure 3 and its comb fingers 11 is reverse biased. Thus, eliminating the need for an additional bias force applied to the rotating element 2 to generate an initial overlap between mobile and stationary comb fingers. Additional bias force such as magnetic or electromagnetic is needed in some known vertical comb-drive actuators to generate the initial overlap. Third, a pn-based vertical comb-drive actuator allows altering the voltage profile across the actuator depth by altering the reverse bias voltage applied across the pn-structure. As the reverse bias voltage increases across first comb fingers, the n-type region 22 depth $T_n$ decreases and the depletion layer 23 depth $T_d$ increases allowing a larger angle of rotation in comparison with the staggered vertical comb actuators.

Figure 4:
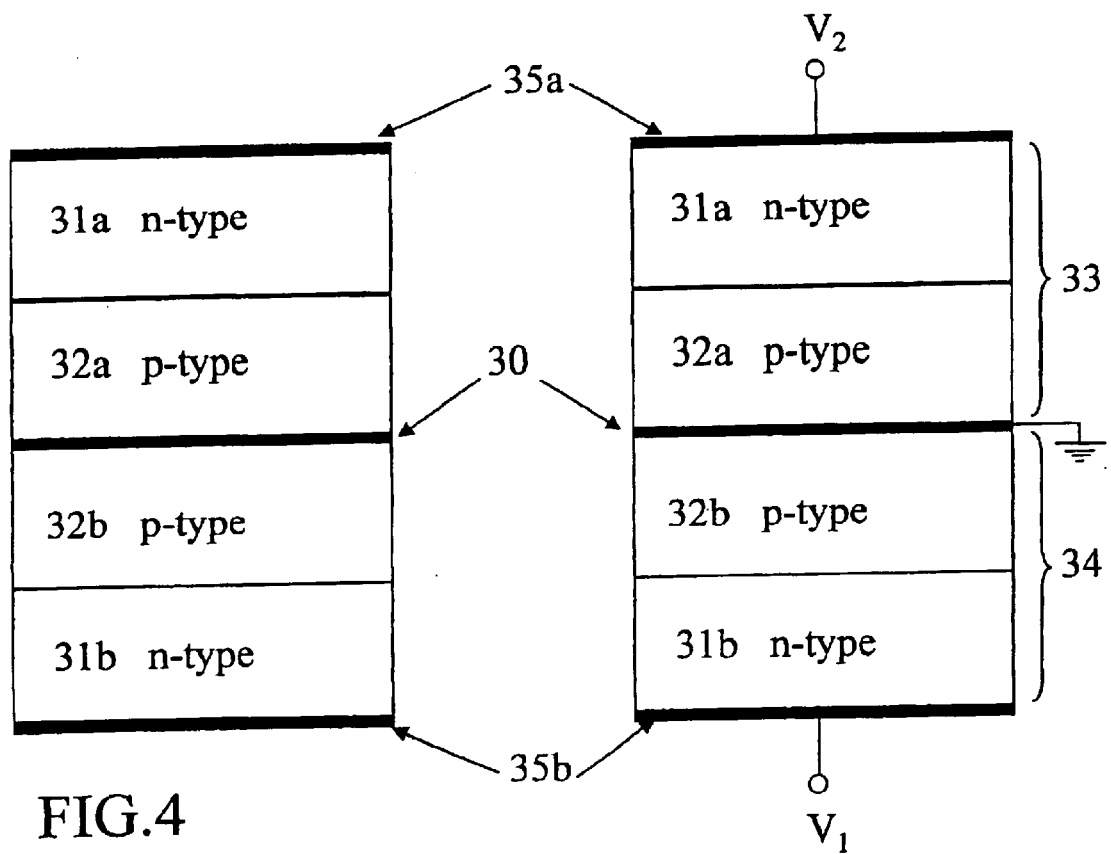
FIG. 4 shows a pn-based vertical comb-drive actuator with two pn-structures connected back to back in accordance with another embodiment of the invention.

In another embodiment, the pn-based vertical comb-drive actuator has 2 pn-structures connected back to back as shown in FIG. 4. The center layer 30 separating the top pn-structure 33 and the bottom pn-structure 34 is conducting and can be, for example, a heavily doped semiconductor layer or a metal layer. By controlling both pn-structures independently through the application of two reverse bias voltages V1 and V2, the rotating element can be rotated in or out of its plane in a push-pull configuration. If V1 is applied across the bottom pn-diode 34 of a first comb-like structure through pad 35b and the n-type region 31a of a second comb-like structure is grounded through pad 35a while V2=0, the second comb-like structure will rotate toward the bottom n-type region 31b of a first comb-like structure. On the other hand, if V2 is applied across the top pn-diode 33 of a first comb-like structure through pad 35a and the n-type region 31b of a second comb-like structure is grounded through pad 35b while V1=0, the second comb-like structure will rotate toward the top n-type region 31a of a first comb-like structure. This push-pull function is achieved using a single comb-drive actuator and has some similarities to the push-pull function provided by the multi-level vertical comb-drive actuators.

Figure 5:
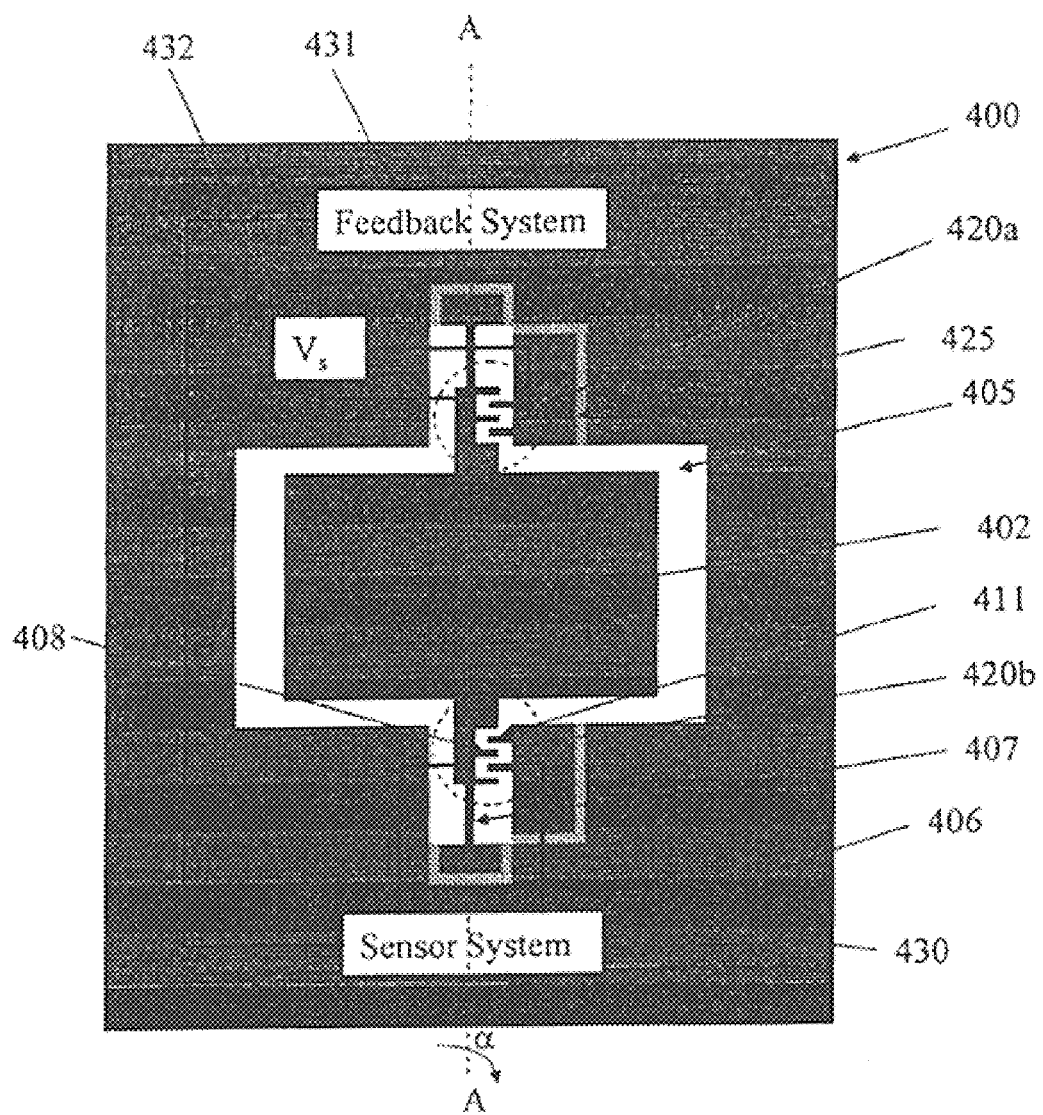
FIG. 5 shows a plan view of a vertical comb-drive actuator acting as an actuator and a position sensor in accordance with another embodiment of the invention.

FIG. 5 shows another embodiment where comb-drive actuators are employed as both rotating actuators and position sensors. In this embodiment, a micro-mirror system 400 may have a sensor system 430 that measures the capacitance between stationary 411 and mobile 408 comb fingers of a comb-drive actuator 420b. Comb-drive actuator 420 may be a pn-based vertical comb-drive actuator, multi-gap actuator, variable-gap actuator or a combination of two or more of these actuators. In a pn-based vertical comb-drive actuator, capacitance between stationary and mobile comb fingers and/or depletion region 23 capacitance of a reverse biased pn-structure can be measured with a sensor system 430. The measured capacitance may then be fedback to a voltage source 432 through a software and/or hardware feedback system 431 to control the position of a rotating element 402, which rotates about flexures 407 axis A in a cavity 405 made in a base 406 below and around the rotating element 402, actuator 420 and flexures 407. Mobile comb fingers 408 are isolated from stationary comb fingers 411 by an insulating layer 425 such as an air gap. Both mobile and stationary comb fingers are isolated from an underlying substrate (not shown in the figure) by an insulating layer such as silicon oxide or a reverse biased pn-junction. In the above scheme, a voltage source 432 drives actuator 420a and a sensor system 430 senses a return signal at comb fingers 408 and 411 of actuator 420b. It is possible to drive and sense a return signal at the comb fingers of one or both actuators 420. Alternative schemes may be used to sense the capacitance of comb fingers such as the use of an AC bias to drive one actuator 420a and sense a return signal at the other actuator 420b. Differential capacitance techniques can also be used to enhance performance and sensitivity of the sensor 430 and feedback 431 systems used to control the position of the rotating element 402. In differential capacitance techniques, two or more capacitances are measured and used to control a rotating element 402 position. Other types of position sensors such as capacitive sensors, magnetic sensors, electromagnetic sensors, optical sensors, piezoresistive sensors, piezoelectric sensors and a combination of two or more of these sensors may be used in a micro-mirror system.

One advantage of the position sensor is the use of the depletion region 23 capacitance of a reverse biased pn-structure and/or capacitance between mobile 408 and stationary 411 comb fingers as a position sensor. In some known sensors, only capacitance between mobile and stationary comb fingers is used in sensing and controlling the position of a rotating element. Another advantage is the large capacitance value obtained in this case. Since comb-drive actuator 420 of FIG. 5 acts directly on the flexures 407, the gap between mobile 408 and stationary 411 comb fingers is smaller leading to higher capacitance than that of some comb-drive actuators. This in turn leads to higher accuracy in capacitance measurements through potentially less complicated measurement schemes.

Figure 6:
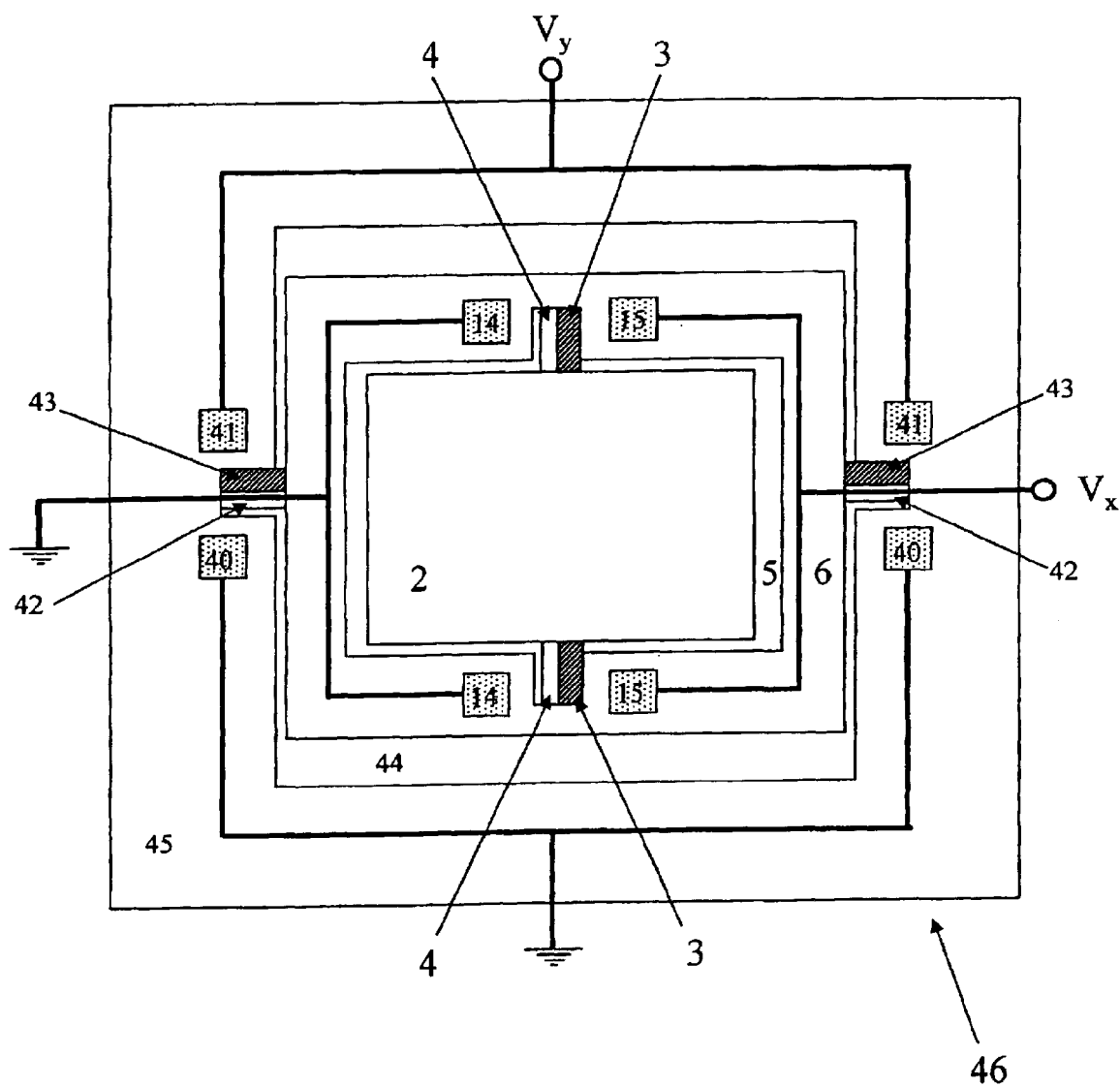
FIG. 6 shows a plan view of a multi-axial micro-mirror system in accordance with a further embodiment of the invention.

A multi-axial micro-mirror system may be formed using designs and processes described herein. One possible multi-axial micro-mirror 46 design is shown in FIG. 6. A first pair of flexures and mobile comb-like structures 4 is used to rotate a rotating element 2 about one axis, and a second pair of flexures and mobile comb-like structures 42 is used to rotate a rotating element 2 and a base 6 about a second axis. In this case, the first and second axes may be perpendicular. The first pair of flexures and mobile comb-like structures 4 connects a rotating element 2 to a rotating support base 6. This support base 6 is connected to a base 45 by a second pair of flexures and mobile comb-like structures 42. Additional rotating support bases and flexures can be added and may provide, for example, mirror alignment. The bias voltage $V_x$ is applied to the inner mobile 4 and stationary 3 comb-like structures through metal pads 14 and 15. The bias voltage $V_y$ is applied to the outer mobile 42 and stationary 43 comb-like structures through metal pads 40 and 41.

Figure 7A:
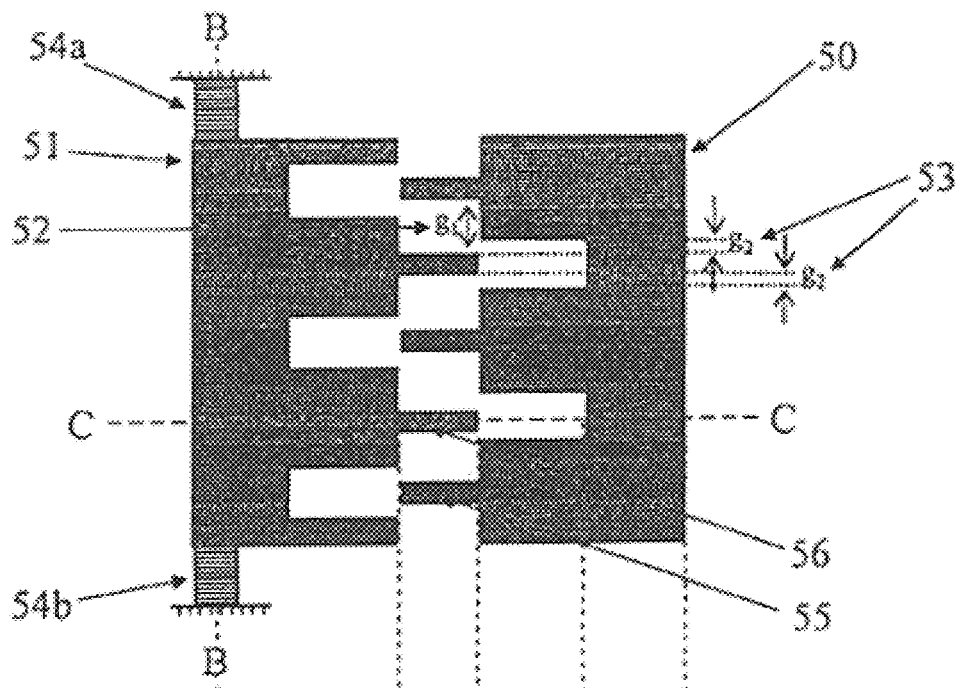
FIGS. 7A–7D show schematic diagrams of plan and cross-sectional views of a multi-gap and variable-gap comb-drive actuators in accordance with another embodiment of the invention.

FIG. 7A shows an embodiment of a multi-gap comb-drive actuator. A multi-gap comb-drive actuator may include a single layer and have more than one gap between stationary and mobile comb fingers. The sizes of these gaps are different. In a multi-gap actuator, the initial capacitance prior to the movement of the mobile comb-like structure results from overlap between stationary and mobile comb fingers in the large gap area. As the mobile comb-like structure moves, the overlap in the smaller gap area between stationary and mobile comb fingers starts its contribution to the overall capacitance whereas contribution in the large gap area starts a rapid decline from its initial capacitance value due to a reduction in overlap area. Since comb fingers capacitance is inversely proportional to the gap size, overlap in the small gap area results in higher capacitance contribution than the capacitance loss in the large gap area. This increase in the overall capacitance with the movement of mobile comb fingers results in the attraction of the mobile comb-like structure toward the stationary comb-like structure with a constant or increasing force.

Figure 7B:
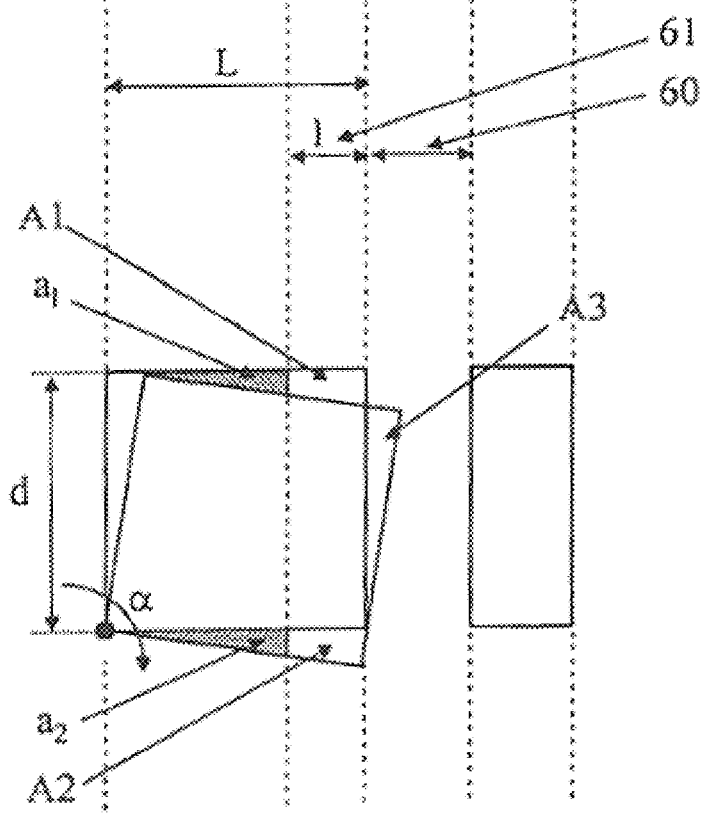

There are two gaps with unequal sizes, a large gap $g_1$ 52 and a small gap $g_2$ 53. FIG. 7B shows a cross section view of FIG. 7A taken along line C. Prior to the movement of the mobile comb-like structure 51, the overlap areas between mobile 56 and stationary 55 comb fingers in the small gap region 60 and large gap region 61 are equal to A and zero, respectively. The initial overlap area A is equal to A=d×l, where d and l are the mobile/stationary comb finger 56/55 depth (FIG. 7B) and length (FIG. 7A), respectively. As the mobile comb-like structure 51 rotates by an angle α, the overlap areas in the small gap 53 region 60 and large gap 52 region 61 become A—$A_1$ and $A_3$, respectively. The initial capacitance is equal to $C_{in}$=2NεA/$g_1$, where N is the number of fingers in mobile comb-like structure 51, ε is the dielectric constant of the material between fingers, and $g_1$ is the width of the large gap 52. As the mobile comb-like structure 51 rotates by an angle α about the flexures axis B, the initial capacitance $C_{in}$ decreases due to the reduction in the overlap area in large gap 52 region 61 and a second capacitance $C_2$ increases starting from zero due to an increase in overlap area in small gap 53 region 60. $C_{in}$ becomes $C_1$=2Nε[A−$A_1$]/$g_1$ and $C_2$ becomes 2Nε$A_3$/$g_2$. Total capacitance becomes $C_{total}$=$C_1$+$C_2$. As long as $A_3$/$g_2$ is larger than $A_1$/$g_1$ for an angle of rotation α, the total capacitance will be increasing resulting in the application of a constant or increasing force thus attracting the mobile comb-like structure 51 toward the stationary comb-like structure 50. This force is directly proportional to the total capacitance rate of change with respect to angle of rotation α. Thus, decreasing the small gap 53 width leads to larger force, which in turn leads to larger angle of rotation and/or lower applied voltage. FIG. 7B shows areas $A_1$, $A_2$, $a_1$, $a_2$, and $A_3$ assuming flexures 54 axis B is located at the bottom of the mobile comb-like structure 51. Furthermore, assuming that the length L and depth d of the mobile comb-like structure 51 are equal, rough estimates of ($A_1$+$a_1$) and $A_3$ are given below.

$$(A_1+a_1)=(L^2/2)[1-\sin(\alpha)]^2 \cdot \tan(\alpha) \quad \text{(Eq. 1)}$$

$$A_3=(L^2/2)[1-\tan(\alpha)]^2 \cdot \tan(\alpha) \quad \text{(Eq. 2)}$$

The ratio of ($A_1$+$a_1$) to $A_3$ is $$(A_1+a_1)/A_3=[1-\sin(\alpha)]^2/[1-\tan(\alpha)]^2 \quad \text{(Eq. 3)}$$

Eq.3 may be used to estimate the minimum gap ratio $g_1$/$g_2$ needed in order to have a constant rate of increase of overall capacitance with the increasing angle of rotation α. For α=1° and 10°, Eqs.3 leads to [($A_1$+$a_1$)/$A_3$]=1.00 and 1.01, respectively. In these calculations, the obtained area ratios are overestimated due to the use of ($A_1$+$a_1$) rather than $A_1$. However, a gap ratio $g_1$/$g_2$ of more than one, assuming that L=d, will lead to a constant increase in the overall capacitance with the increasing angle of rotation.

In case of a single-gap torsional comb-drive actuator, the total capacitance is usually constant and/or decreasing with the increasing angle of rotation α resulting in diminishing force and very small angle of rotation α. Vertical and/or rotational movement of a rotating element 2 can be obtained by using a multi-gap comb-drive actuator to apply an attraction force on the flexures 7 and/or the rotating element 2.

Figure 7C:
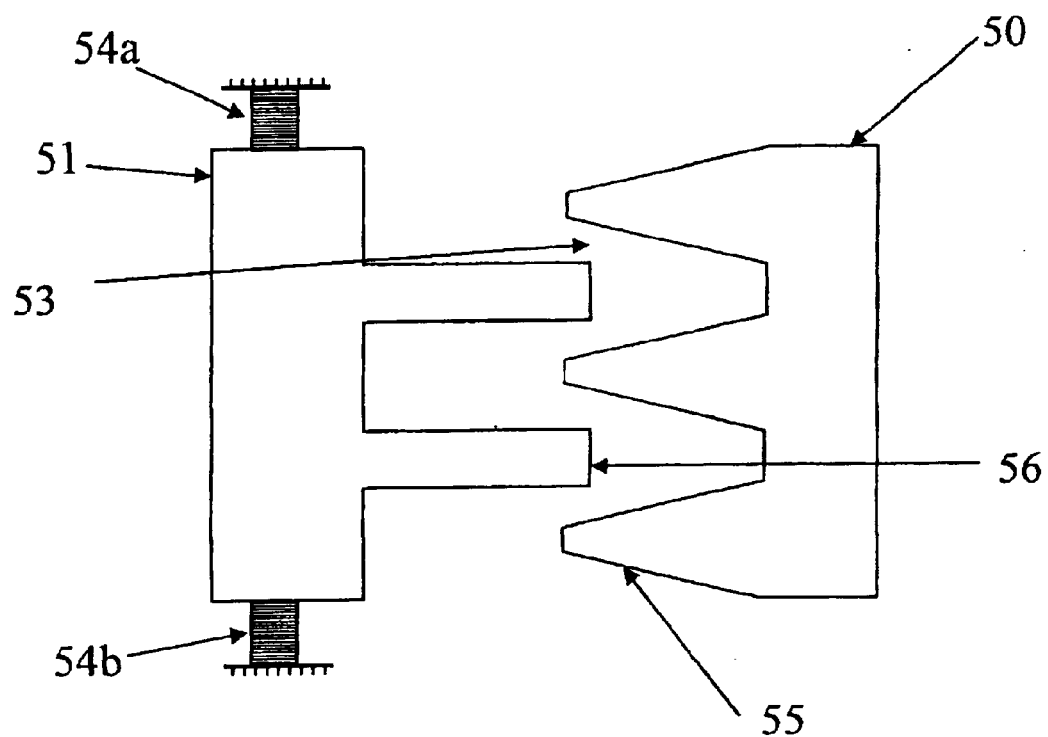
Figure 7D:
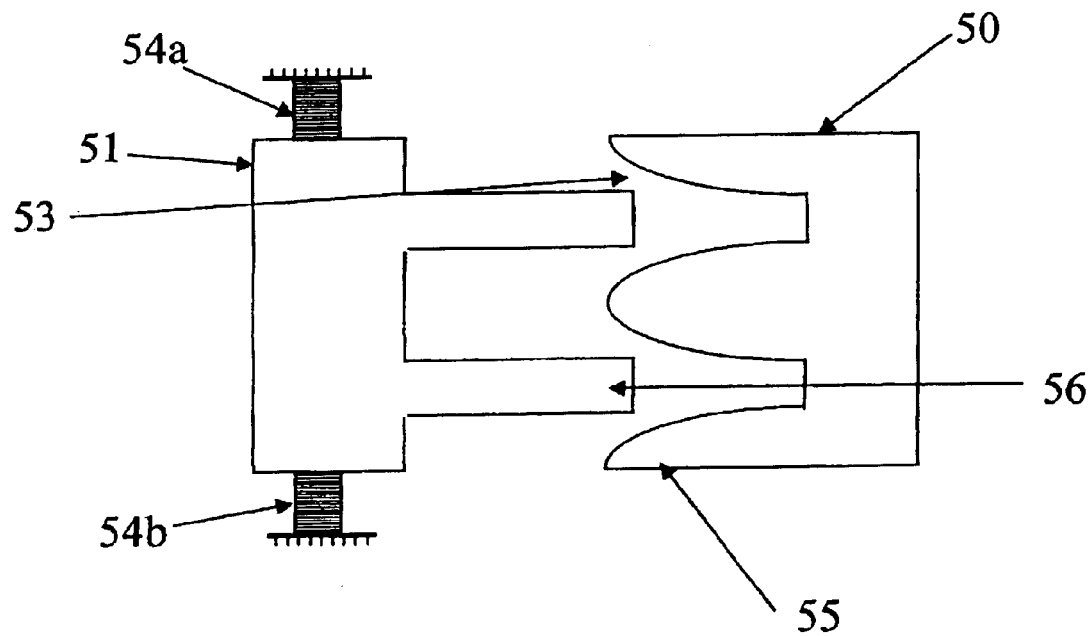

FIGS. 7C–7D show a variable-gap comb-drive actuator. A variable-gap comb-drive actuator may consist of a single layer and has a single gap that decreases in size with the movement of the mobile comb-like structure. Contributions to overall capacitance increase with this movement resulting in attracting the mobile comb-like structure toward the stationary comb-like structure with a constant or increasing force. In single gap comb-drive actuators, the rapid decline in overall capacitance leads to a significant decline in the attraction force, which in turn leads to a significant decrease in the angle of rotation.

In this case, the stationary 55 and/or mobile 56 comb fingers are shaped so that the gap size 53 decreases continuously with the movement of the mobile comb-like structure 51 rather than the discrete decrease in gap size shown in FIG. 7A. The gap size 53 decreases linearly as shown in FIG. 7C whereas FIG. 7D shows a non-linear decrease in the gap size 53. Shapes of mobile 56 and stationary 55 comb fingers described in this invention are given as examples for illustration purposes and not to limit the scope of this concept. In general, comb fingers can take any shape in order to enhance the actuator performance and/or set the rate of increase of capacitance as a function of the angle of rotation $\alpha$. Mobile 56 and/or stationary 55 comb fingers in one actuator may take various shapes including conventional, variable-gap and multi-gap shapes.

Figure 8A:
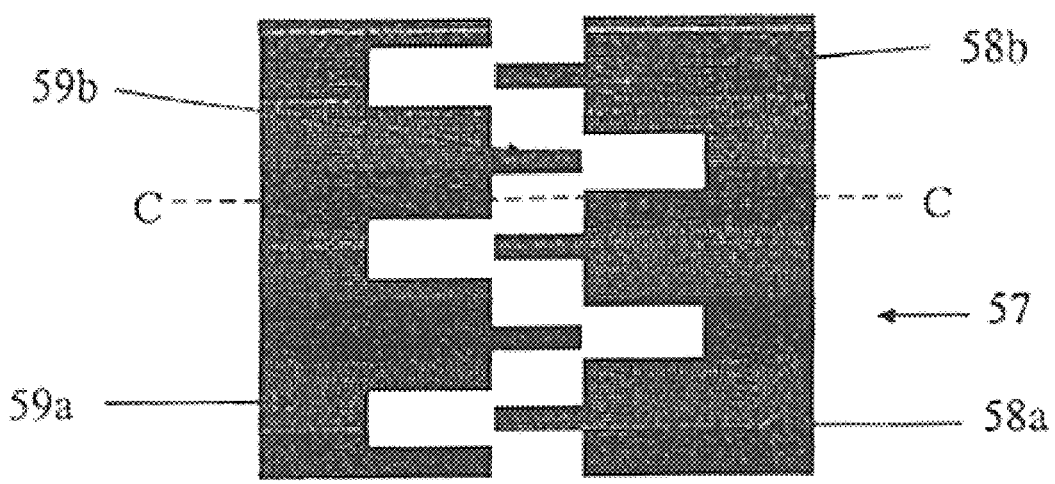
FIGS. 8A–8B show schematic diagrams of plan and cross-sectional views of a pn-based vertical comb-drive actuator used in conjunction with a multi-gap comb-drive actuator in accordance with a further embodiment of the invention.
Figure 8B:
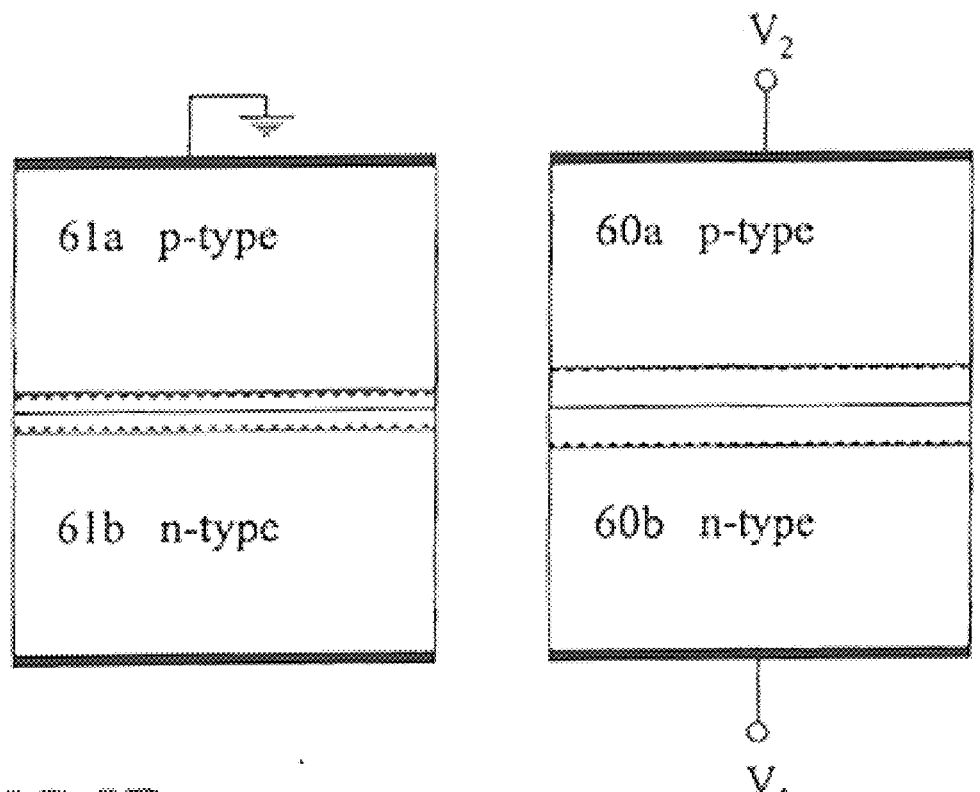

A pn-based vertical comb-drive actuator is used in conjunction with a multi-gap comb-drive actuator to rotate a rotating element 2 about flexures 7 axis A. FIG. 8A shows a plan view of the comb-drive actuator and FIG. 8B shows a cross section view of FIG. 8A taken along line C. The pn-structure 60 of a first comb-like structure 58 is reverse biased through the application of V1 to the n-type region 60$b$ and V2 to p-type region 60$a$ with V1 being larger than V2. The p-type region 61$a$ of a second comb-like structure 59 is grounded. This biasing scheme allows p-type regions 60$a$ and 61$a$ of first 58 and second 59 comb-like structures to contribute to the applied torque through a multi-gap comb-like structure, in addition, it allows a n-type region 60$b$ of a first comb-like structure 58 and a p-type region 61$a$ of a second comb-like structure 59 to contribute to the applied torque through a pn-base comb-like structure. As soon as a second comb-like structure 59 starts moving beyond the maximum angle of rotation offered by a multi-gap comb-drive actuator, V2 can be reduced and V1 can be increased in order to obtain a larger angle of rotation. This approach takes advantage of both the pn-based and multi-gap comb-drive actuators to increase the angle of rotation and/or reduce the actuation voltage. A multi-gap comb-drive actuator of this type can be used to generate a large initial overlap between the p-type region 61$a$ of second comb fingers 59$b$ and the n-type region 60$b$ of first comb fingers 58$b$. In addition, this multi-gap comb-drive actuator can be used in conjunction with other vertical comb drives to generate an initial overlap between mobile and stationary comb fingers eliminating the need for additional bias force such as magnetic, electromagnetic, and stress-based forces.

Figure 9:
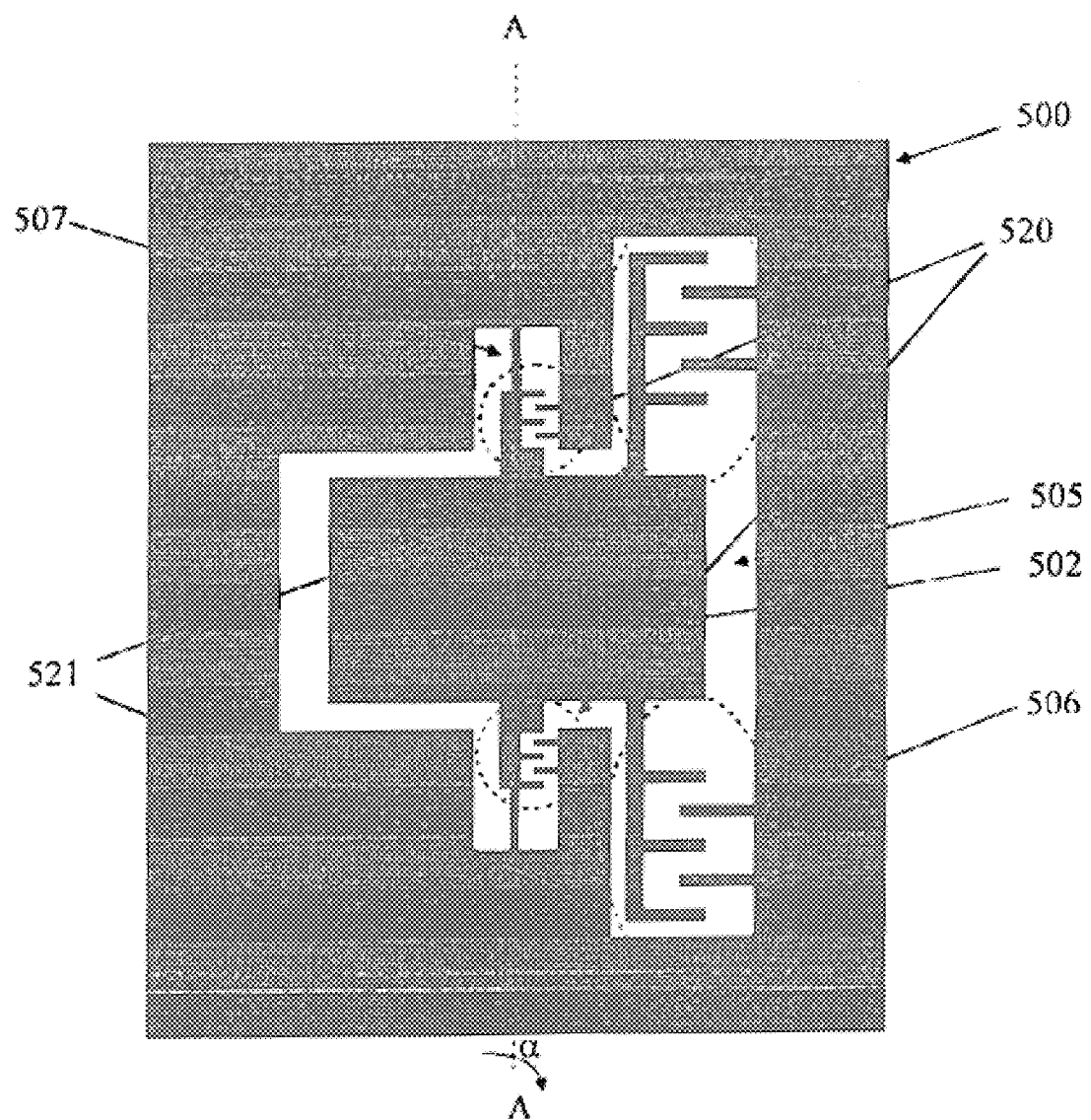
FIG. 9 shows a plan view of a micro-mirror system with one comb-drive actuator acting directly on the flexures and a second comb-drive actuator acting directly on a rotating element in accordance with yet another embodiment of the invention.

FIG. 9 shows a system where a micro-mirror system 500 uses one comb-drive actuator 520 to act directly on the flexures 507 and a second comb-drive actuator 521 to act directly on a rotating element 502. The first 520 and second 521 comb-drive actuators can be pn-based vertical comb-drive actuators, variable-gap comb-drive actuators, multi-gap comb-drive actuators, or any other suitable vertical comb-drive actuators and combinations thereof. This arrangement permits the application of a larger force, thus, reducing the applied voltage and/or increasing the angle of rotation $\alpha$. One may also drive and sense a return signal at the comb fingers of first 520 comb-drive actuator, second 521 comb-drive actuator or both comb-drive actuators 520 and 521 in order to control the position of a rotating element 502, which rotates about flexures 507 axis A in a cavity 505 made in a base 506 below and around the rotating element 502, actuators 520 and 521 and flexures 507. Uni-axial and multi-axial micro-mirror systems can be implemented based on this configuration.

Figure 10A:
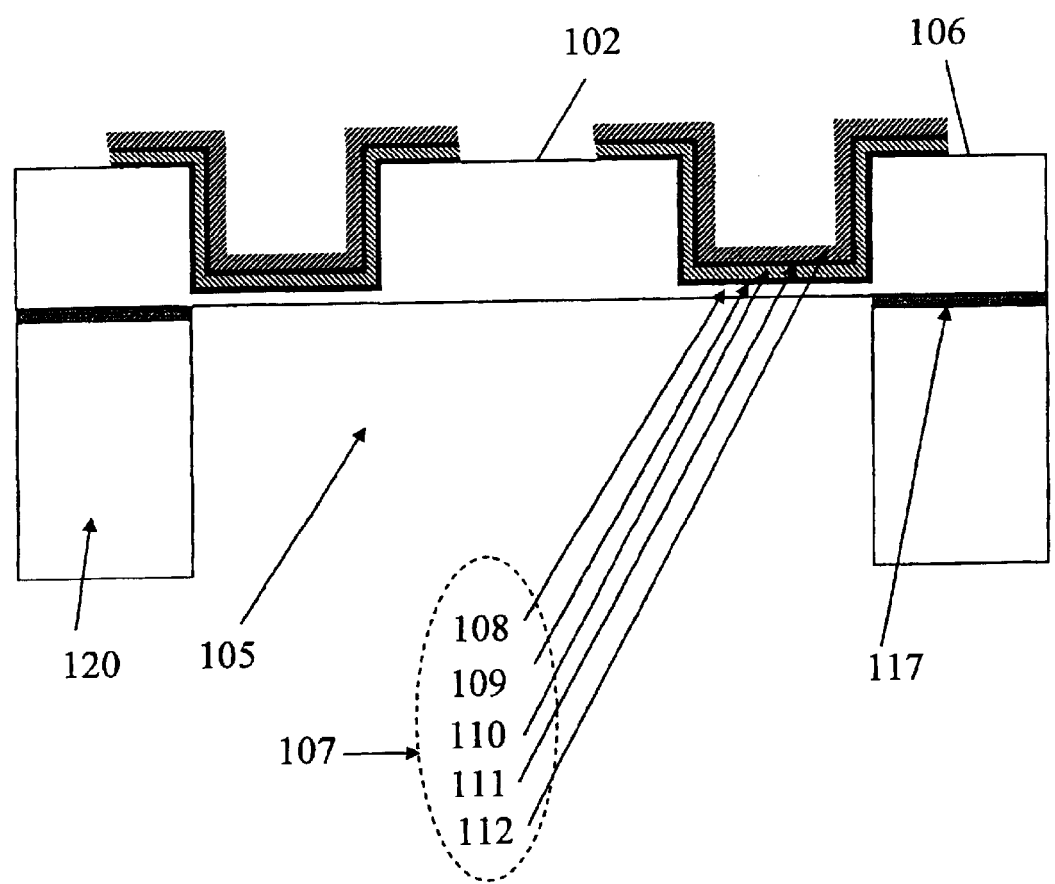
FIGS. 10A–10B show schematic views of a micro-mirror system where multi-layered flexures, serpentine springs and soft wires are used to create additional electrical paths in accordance with a further embodiment of the invention.
Figure 10B:
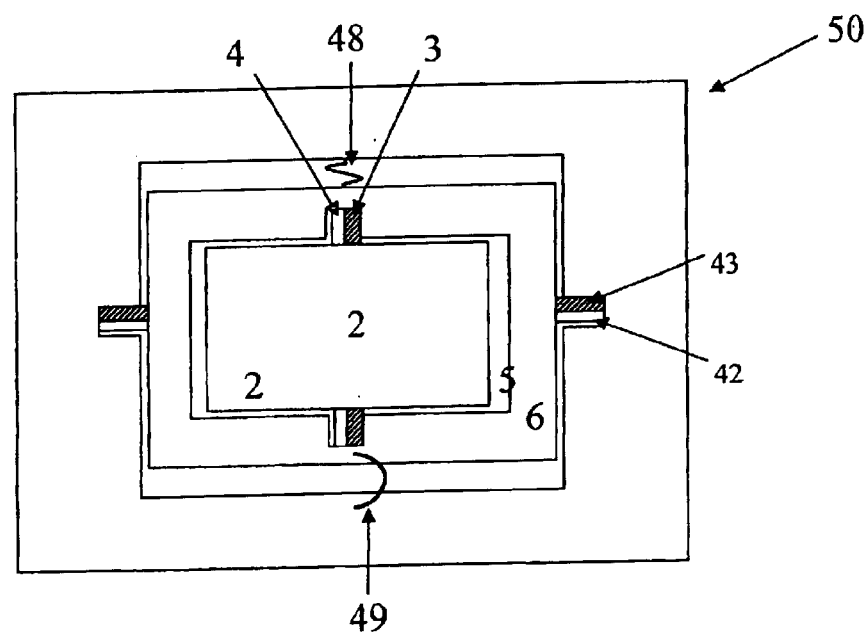

If additional electrical paths are needed, for example, for the second comb-drive actuator 521 of FIG. 9 or for the inner comb-drive actuators 3 and 4 of FIG. 6, they can be provided through multi-layered flexures 107 as shown in FIG. 10A. In this case, the flexure consists of a first layer 108, a first insulating layer 109, a first conducting layer 110, a second insulating layer 111, and a second conducting layer 112. A first layer 108 is connected to the base 106 and may be insulating, semiconducting or conducting layer. Insulating layers 109 and 111 can be silicon oxide, silicon nitride or any other insulating material. Conducting layers 110 and 112 can be highly doped silicon or metal such as gold. The flexures 107 suspend a rotating element 102 over a cavity 105 formed in a base 106. An insulating layer 117 such as silicon oxide provides electrical isolation between the substrate 120 and the base 106. The impact of these insulating 109 and 111 and conducting 110 and 112 layers on the mechanical properties of the mirror system can be controlled. Alternatively, FIG. 10B shows the use of flexible serpentine springs 48 and soft wires 49, which may have minimal impact on the mechanical properties of the micro-mirror system 50, to provide additional electrical paths for the inner comb-drive actuators 3 and 4. Wire-bond techniques can be used to bridge the gap with soft wires 49 during packaging, whereas the serpentine springs 48 can be formed during the fabrication process of the micro-mirror system 50.

Figure 11A:
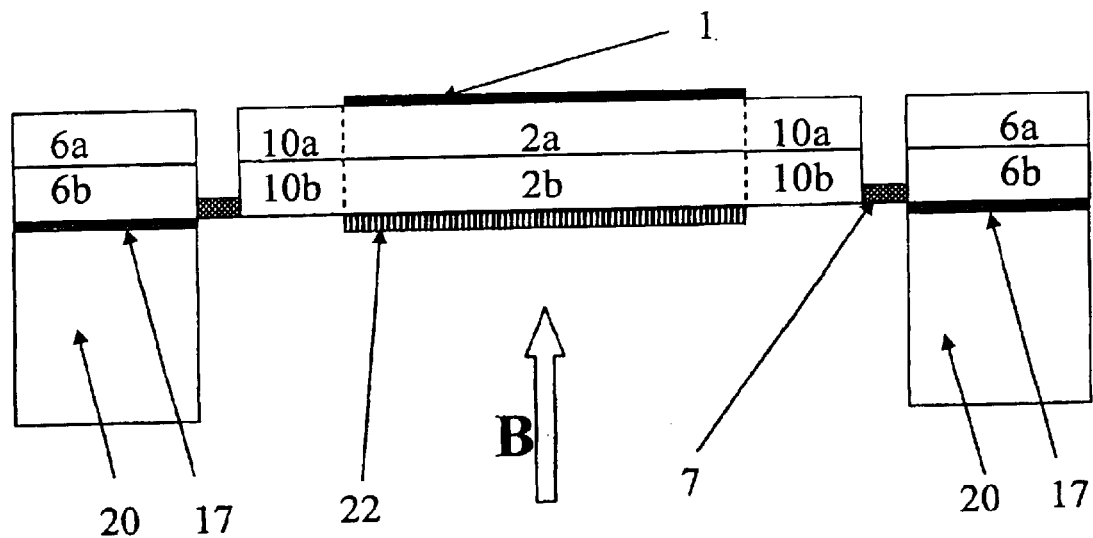
FIGS. 11A–11B show schematic cross-section views of a micro-mirror system wherein a magnetic bias force is used in conjunction with comb-drive actuators in accordance with a further embodiment of the invention.
Figure 11B:
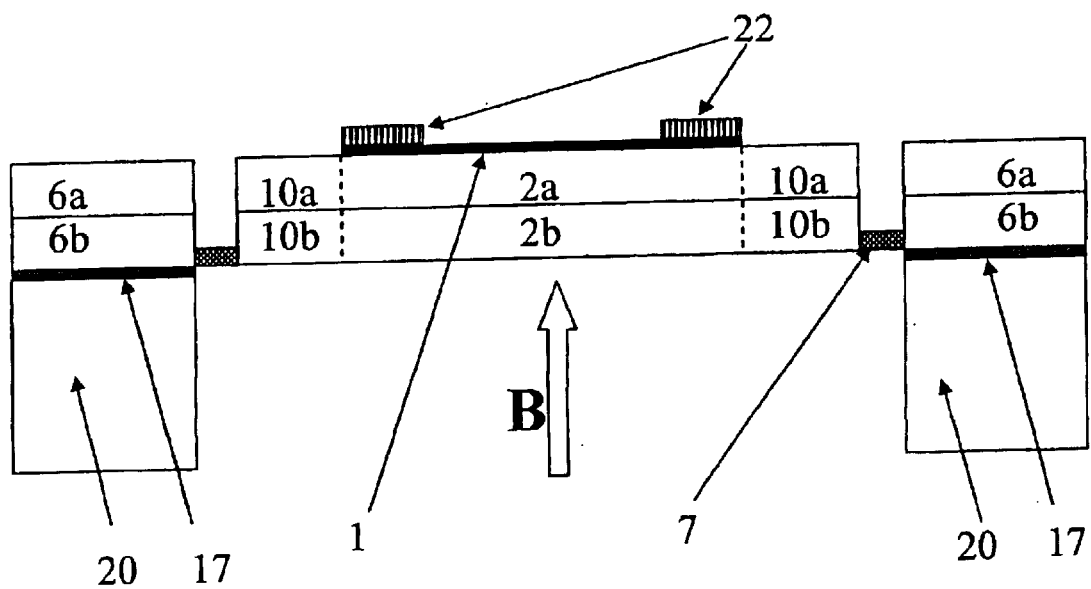

Another system uses a bias force in conjunction with comb-drive actuators disclosed herein. A cross section view of the micro-mirror system 25 of FIG. 2A taken along centerline A is shown in FIGS. 11A–11B. A magnetic material 22 is applied to the bottom (FIG. 11A) and top (FIG. 11B) of a rotating element 2 totally or partially in order to give it a magnetic moment. The driving magnetic field B is given by an external magnet or electromagnet mounted below the rotating element 2 or at angle with it. A magnet may apply a fixed magnetic field, whereas, an electromagnet such as a current carrying coil may apply a varying magnetic field. Therefore, external magnet or electromagnet applies a bias force to the rotating element 2 causing it along with the mobile comb fingers 8 (FIG. 2B) to rotate. Thus, a large initial overlap between mobile 8 and stationary comb fingers 11 is achieved upon the application of a bias force. The comb-drive actuator is then used to apply force in the opposite direction to bring the rotating element 2 back to its initial position prior to the application of the bias force in a controlled fashion. It is possible to use the comb-drive actuator solely as a position sensor and use the bias force to move the rotating element 2. The magnetic material can be patterned in order to optimize the mechanical and actuation performance of the torsional micro-mirror system 25.

There are numerous ways to establish a magnetic moment normal to the surface of the flexures 7 and/or rotating element 2. For example, flexures 7 of the micro-mirror system 25 may be made of a magnetic material and/or a magnetic material may be applied to them. Alternatively, a conduction coil can be fabricated on the surface of the rotating element 2, which provides a magnetic moment upon the application of a current. Also, a permanent magnet can be mounted on the rotating element 2 to provide a magnetic moment perpendicular to the surface of the rotating element 2. In addition to magnetic actuators, bias force actuators include, but not limited to, actuators based on films/materials with stress gradient across their thickness, actuators based on thermal bimorph materials, mechanical actuators such as spring loaded elements, piezoelectric actuators, comb-drive actuators, and capacitive actuators such as a pair of gap-closing electrodes.

Figure 12:
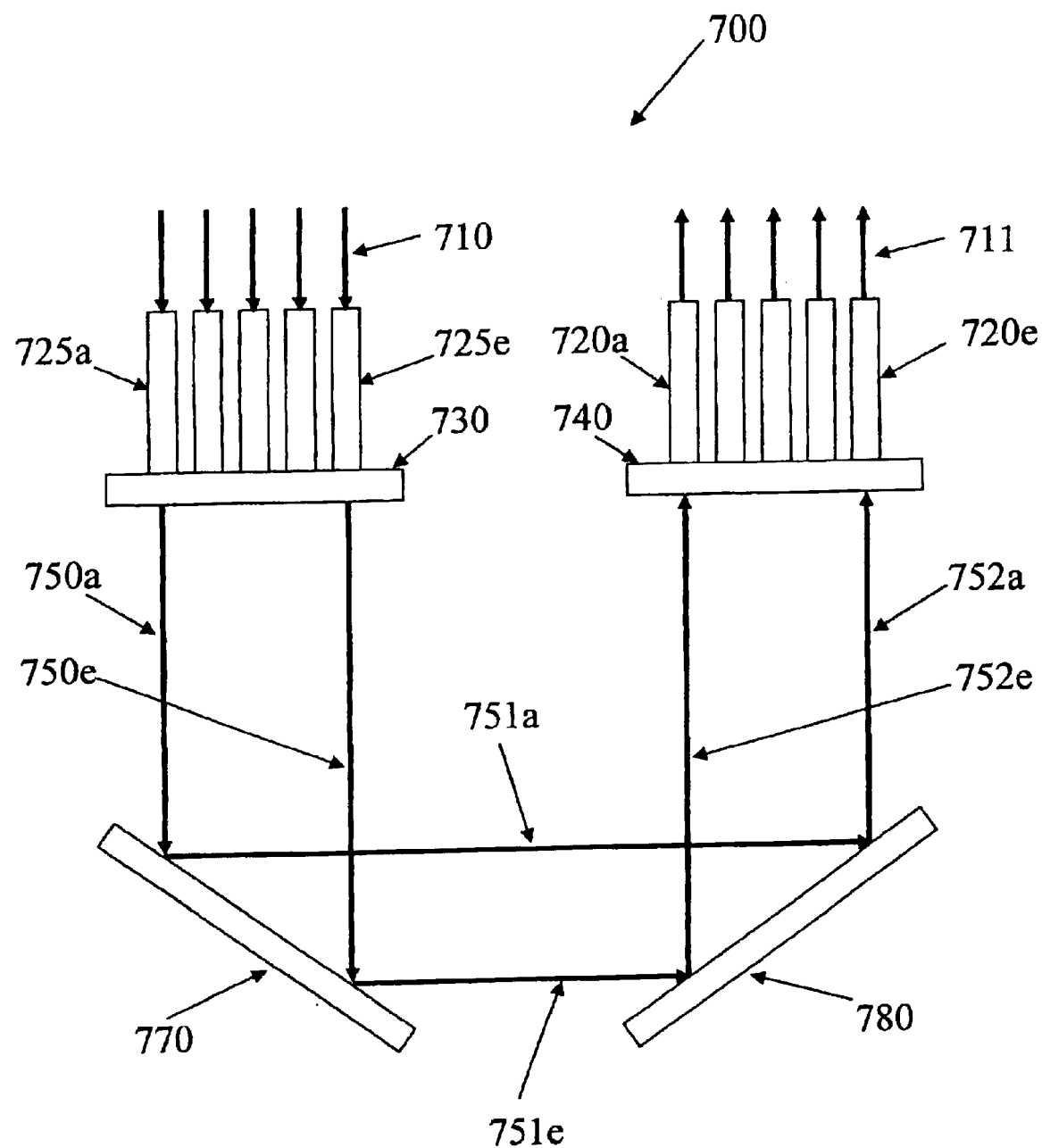
FIG. 12 shows a schematic view of an optical crossconnect in accordance with a further embodiment of the invention.

FIG. 12 shows of an optical crossconnect 700 employing mirror arrays of uni-axial and bi-axial micro-mirror systems. Crossconnect 700 receives input optical signal 710 through an array of optic fibers 725, which is shown in FIG. 12 as a one-dimensional array with five fibers 725$a$, 725$b$, 725$c$, 725$d$, 725$e$. Input fiber array 725 is aligned with input lens array 730 so that each fiber of input fiber array 725 transmits corresponding optical signal of input optical signal 710 to a corresponding lens of input lens array 730 for collimation. Optical signal 750 collimated via input lens array 730 first strikes input mirror array 770 and is reflected onto output mirror array 780, which reflects optical signal 751 head-on to output lens array 740. Output mirror array 780 is positioned to receive optical signal 751 from the input mirror array 770. Optical signal 752 is coupled into output fiber array 720 via output lens array 740 and transmitted through output fiber array 720 to output optical signal 711. Input fiber array 725, input lens array 730, and input mirror array 770 are aligned and have equal array sizes. Thus, there is a one-to-one-to-one mapping of each input fiber to an input lens to an input mirror. This mapping allows coaxial alignment of the input and output optical signals with the fiber axes leading to low power loss. This is critical in single mode fibers due to the small numerical aperture. Similarly, output fiber array 720, output lens array 740, and output mirror array 780 are aligned and have equal array sizes with one-to-one-to-one mapping of each output fiber to an output lens to an output mirror. Input/output fiber, lens and mirror arrays are preferably two-dimensional N×N arrays. Each micro-mirror in input 770 and output 780 mirror arrays may tilt in an independent manner so that optical signals are steered on an individual basis. Input 770 and output 780 mirror arrays may include uni-axial and bi-axial micromirror systems disclosed herein or combinations of both types. Any or all aspects of the systems disclosed herein, such as position sensing schemes, may be utilized in the crossconnect of FIG. 12 or in alternative configurations of optical crossconnects.

Fabrication methods are provided for multi-gap comb-drive actuators, variable-gap comb-drive actuators, pn-based comb-drive actuators, comb-drive position sensors, and torsional micro-mirror systems. Due to the simple structure of these actuators, their fabrication methods have significant advantages over fabrication methods of some known staggered vertical comb-drive actuators. Actuators disclosed herein include a single layer with one or more types of conducting and/or semiconducting layers stacked on top of each other without an insulating layer such as silicon oxide between successive layers. This insulating layer is required in case of some staggered vertical comb-drive actuators. Eliminating such insulating layer simplifies the fabrication process of the actuator and allows the use of silicon wafers or silicon-on-insulator (SOI) wafers that have only one insulating layer rather than two or more insulating layers.

A method of fabricating multi-gap, variable-gap and pn-based comb-drive actuators is shown in FIGS. 13A–13E. Comb-drive actuators disclosed herein can be made using various processes including, but not limited to, standard photolithography, plasma etch of thin films such as silicon oxide, deep reactive ion etch (RIE) of silicon, and thin film growth and deposition, or any other suitable semiconductor fabrication process.

Figure 13A:
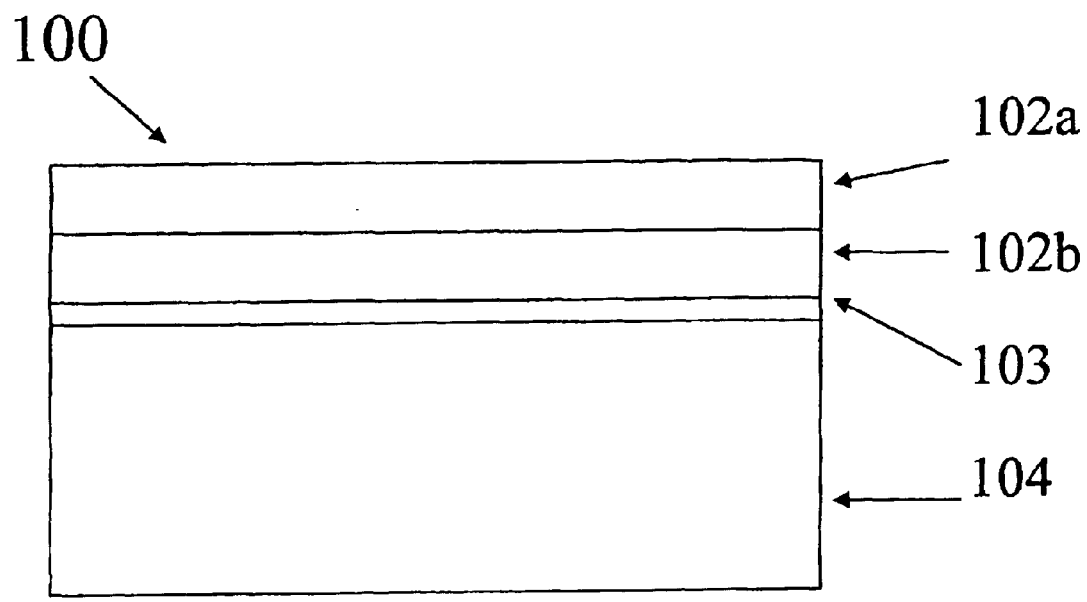
FIGS. 13A–13E show cross-sectional views of the fabrication process of pn-based, multi-gap, and variable-gap comb-drive actuators in accordance with a further embodiment of the invention.

A cross section view of a substrate that has a first conducting and/or semiconducting layer 102, an optional second insulating layer 103, and an optional substrate 104 is shown in FIG. 13A. Conducting and/or semiconducting layer 102 can be a single crystalline silicon, but can also be made of other appropriate single-crystalline, polycrystalline or amorphous semiconducting materials such as Si, SiC, Ge, GaAs, InP, diamond and combinations thereof. In case of a pn-based comb-drive actuator, layer 102 consists of a p-type layer 102a on top of a n-type layer 102b. These layers 102a and 102b can be grown on top of each other using chemical vapor deposition (CVD) or molecular beam epitaxy (MBE) methods. Alternatively, one can start with a p-type layer and dope either the top or bottom side with n-type dopant in order to create a pn-structure. Doping techniques such as diffusion or ion implantation can be used to make pn-structures out of either p- or n-type semconducting layers. Insulating layer 103 is preferably thermally grown silicon oxide but can be made of other insulating materials such as silicon nitride, un-doped diamond and reverse biased pn-junction. Substrate layer 104 can be silicon and can be, but not limited to, a combination of one or more of one of the following materials: Single-crystalline silicon, poly-crystalline silicon, amorphous silicon, single-crystalline silicon carbide, poly-crystalline silicon carbide, single-crystalline silicon germanium, poly-crystalline silicon germanium, single-crystalline diamond, poly-crystalline diamond, ceramic, metal (e.g., Au, Al, and Ni), silicon nitride, and silicon oxide. In case of multi-gap and variable-gap comb-drive actuators, layer 102 can be made of the same materials of the substrate layer 104.

Figure 13B:
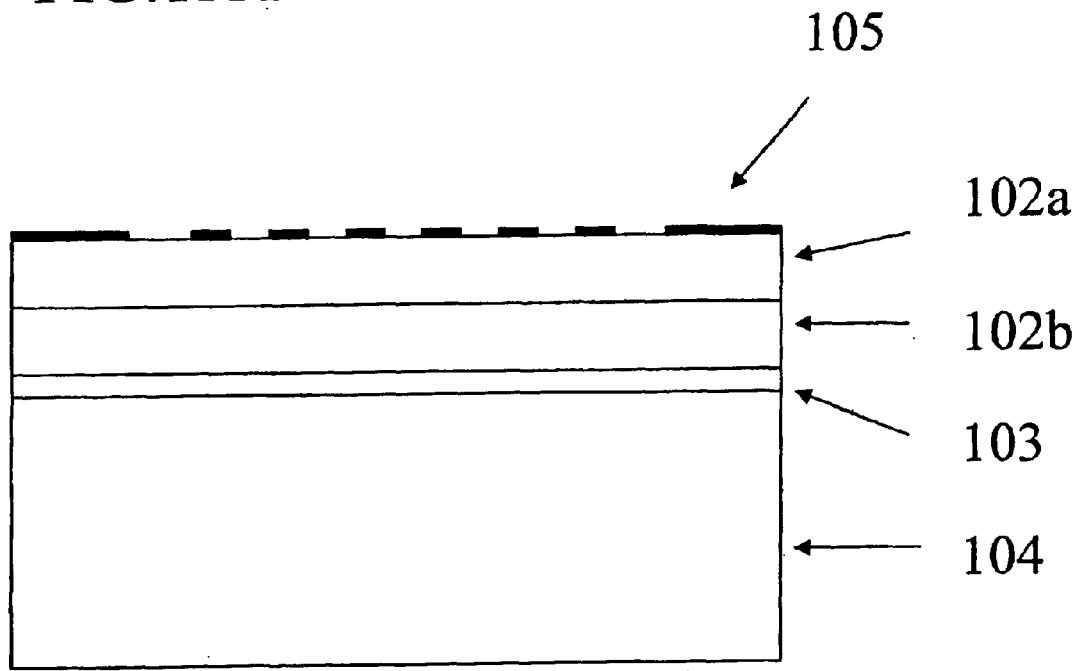
Figure 13C:
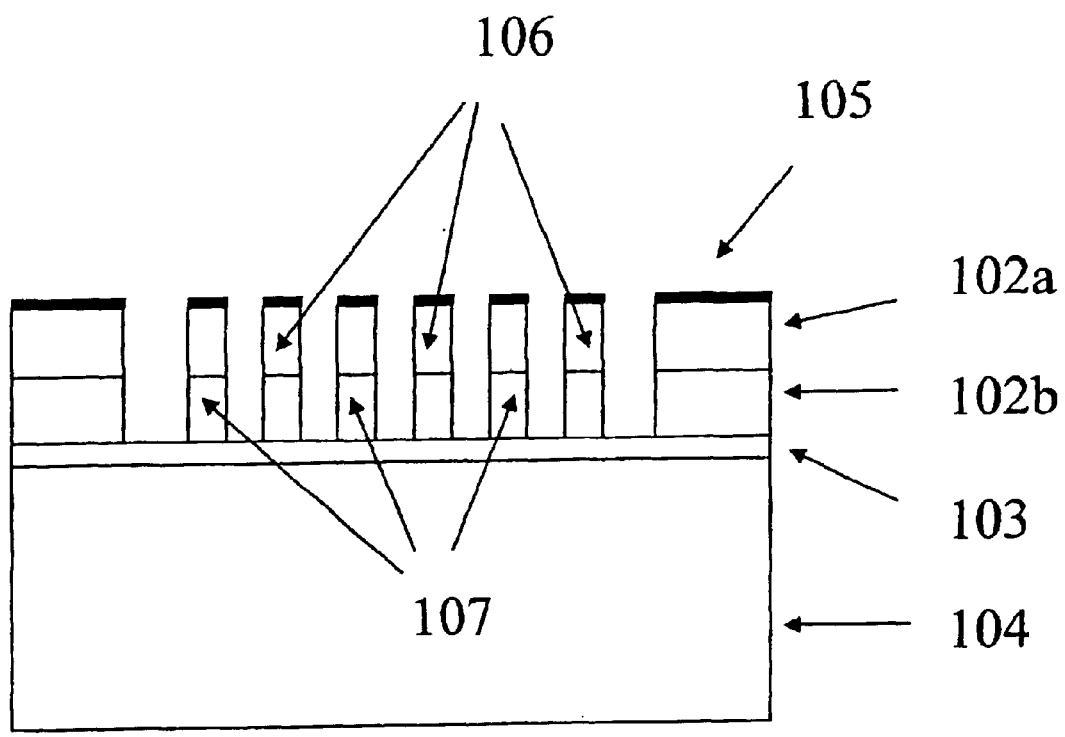
Figure 13D:
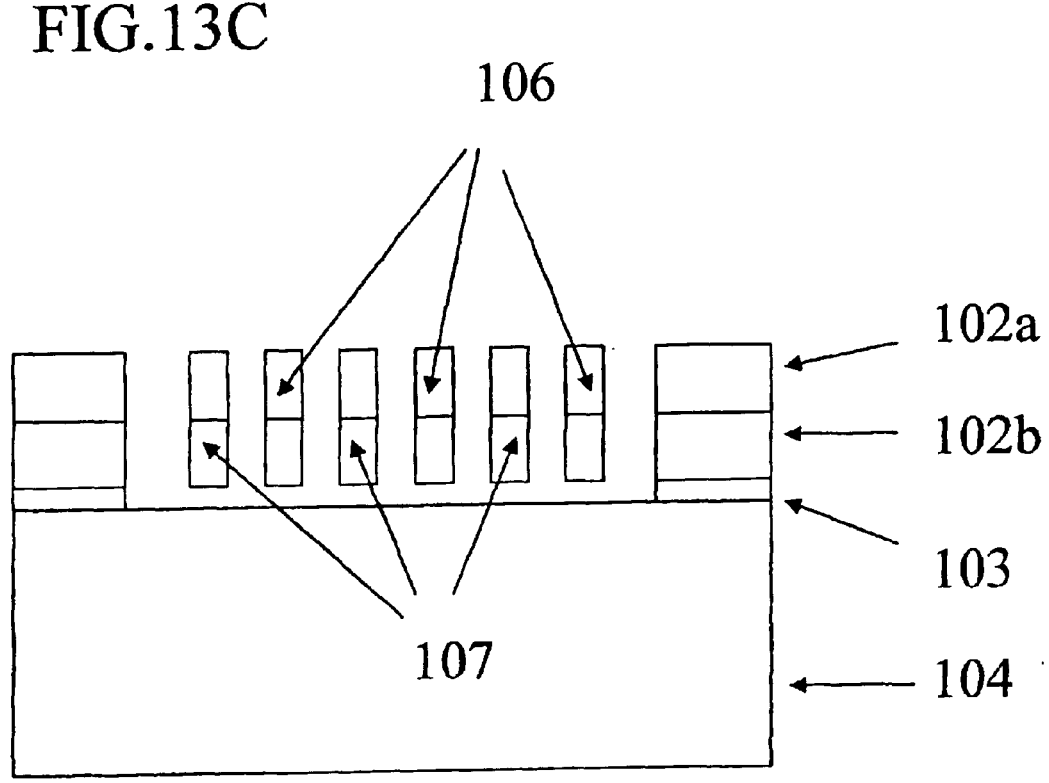
Figure 13E:
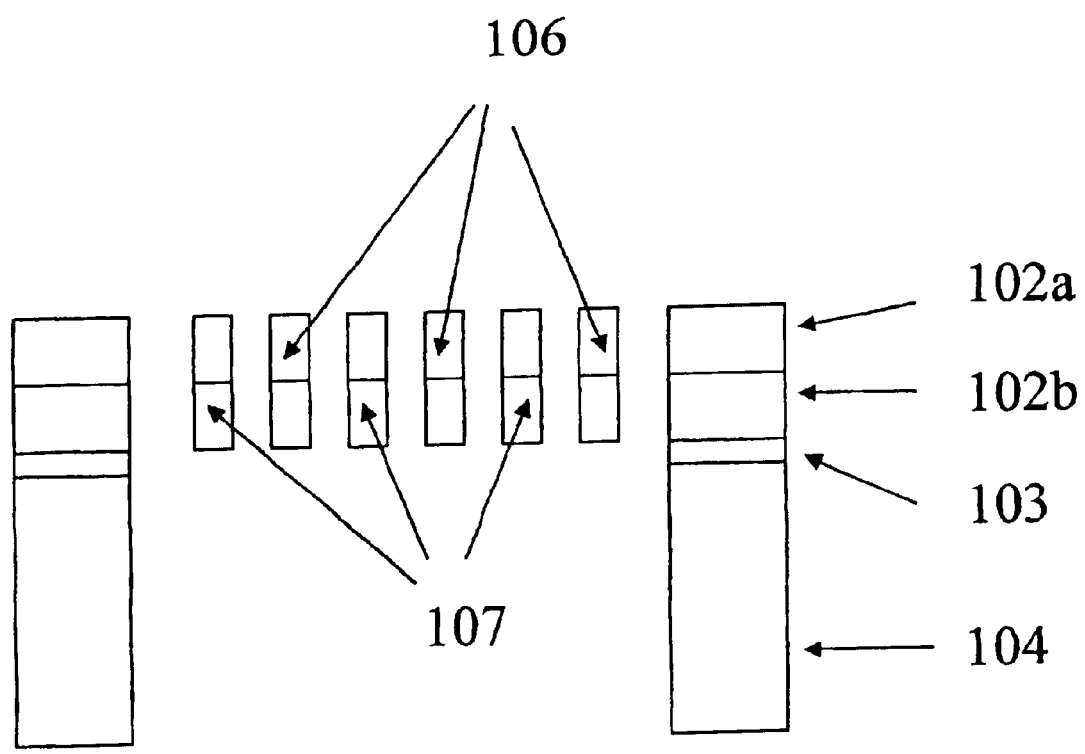

FIG. 13B shows a cross section view of a patterned layer 105, which defines a comb-like actuator. This layer 105 is deposited on top of layer 102 and acts as a masking layer during the process of etching the conducting and/or semiconducting layer 102. This masking layer 105 can be silicon oxide, silicon nitride, photoresist or another suitable material. FIG. 13C shows a cross section view of a first 106 and second 107 comb fingers after etching layer 102 in the areas that have no masking protection. The masking layer 105 and the insulating layer 103 are subsequently removed as shown in FIG. 13D using appropriate etch techniques. At this stage, the comb-drive structure is released from the substrate and mobile comb-like structure can be moved away from the substrate 104 surface. A portion of the optional substrate layer 104 is removed as shown in FIG. 13E allowing the mobile comb-like structure to move below the substrate 104 surface. The order of the described fabrication steps can be changed and still obtain the desired structure at the end of the fabrication process. This fabrication process can be used to make multi-gap, variable-gap, comb-drive position sensors and pn-based comb-drive actuators.

A method is now described for fabricating a pn-based vertical comb-drive actuator with a first comb-like structure that has either a p-type layer or n-type layer removed and a second comb-like structure that has a pn-structure. FIGS. 14A–14I show a cross section view of the fabrication process.

Figure 14A:
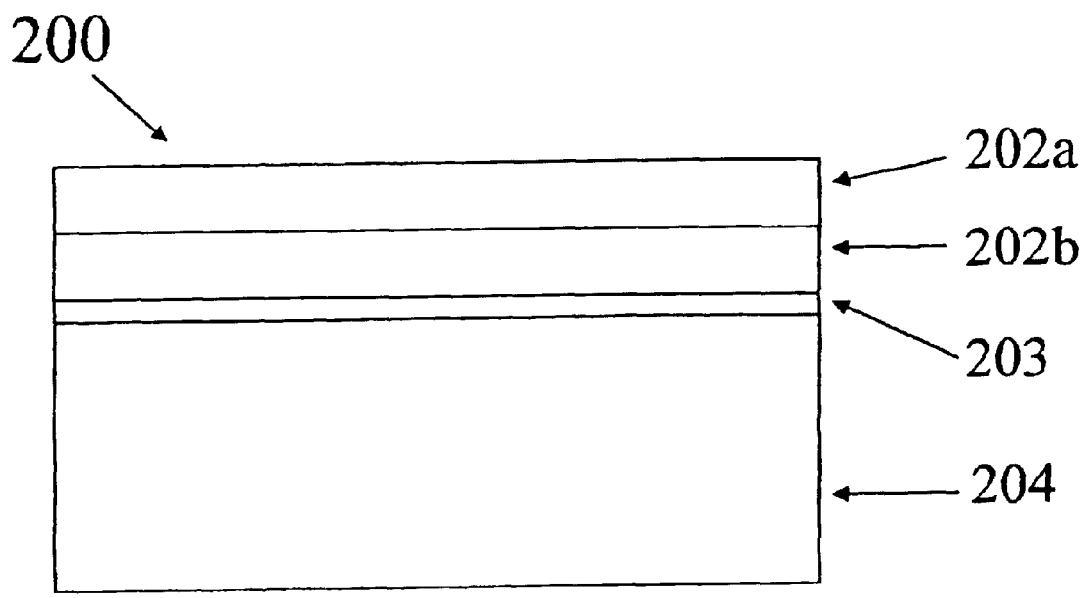
FIGS. 14A–14I show cross-section views of the fabrication process of pn-based, multi-gap, and variable-gap comb-drive actuators in accordance with another embodiment of the invention.

FIG. 14A shows a cross section view of a substrate that has a first conducting and/or semiconducting layer 202, an optional second insulating layer 203, and an optional substrate 204.

Layer 202 can be single crystalline silicon and may consist of a p-type layer 202a on top of a n-type layer 202b. Insulating layer 203 is preferably thermally grown silicon oxide. Substrate layer 204 can be silicon.

Figure 14B:
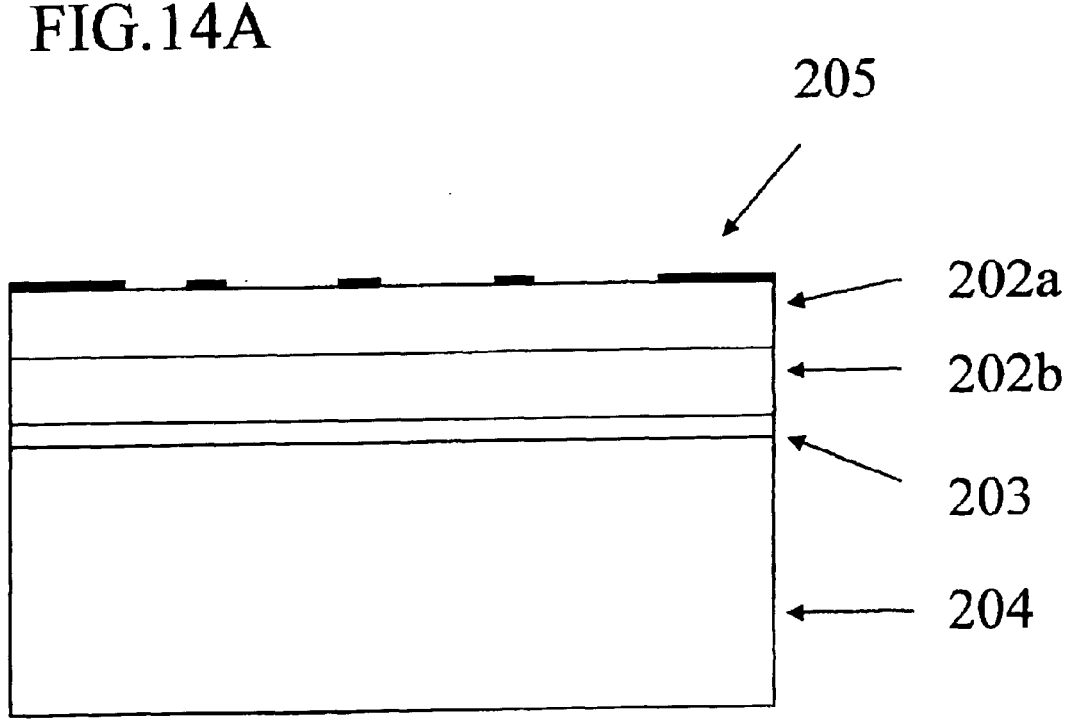
Figure 14C:
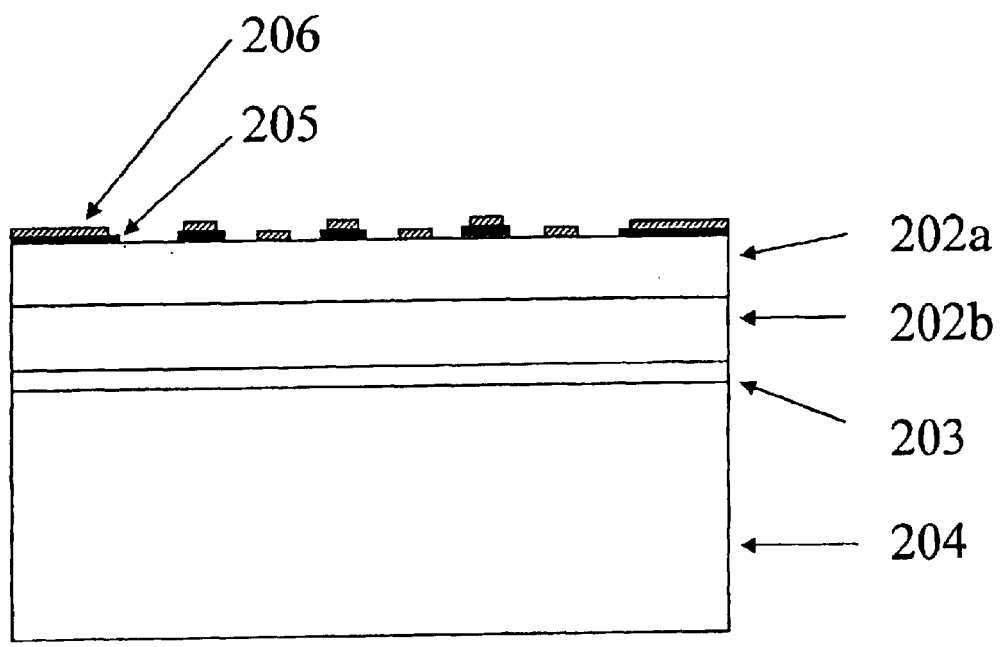
Figure 14D:
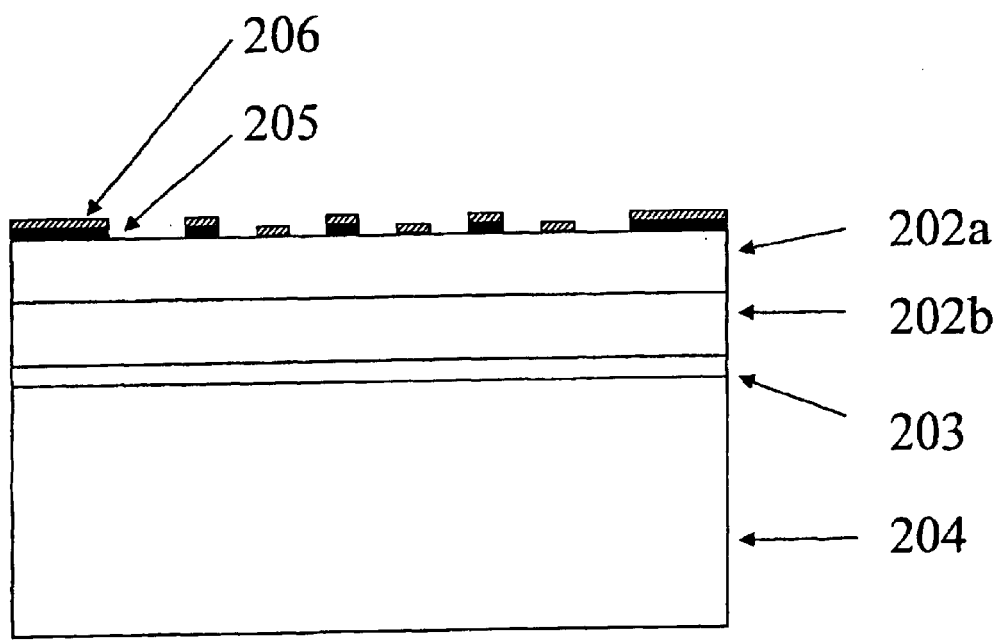
Figure 14E:
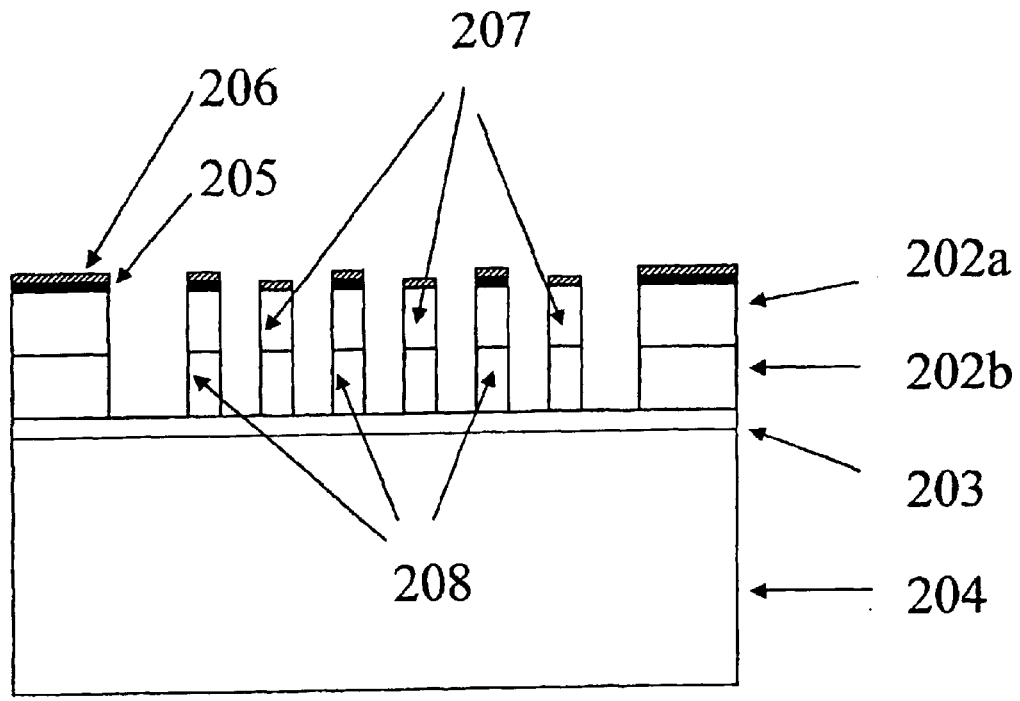
Figure 14F:
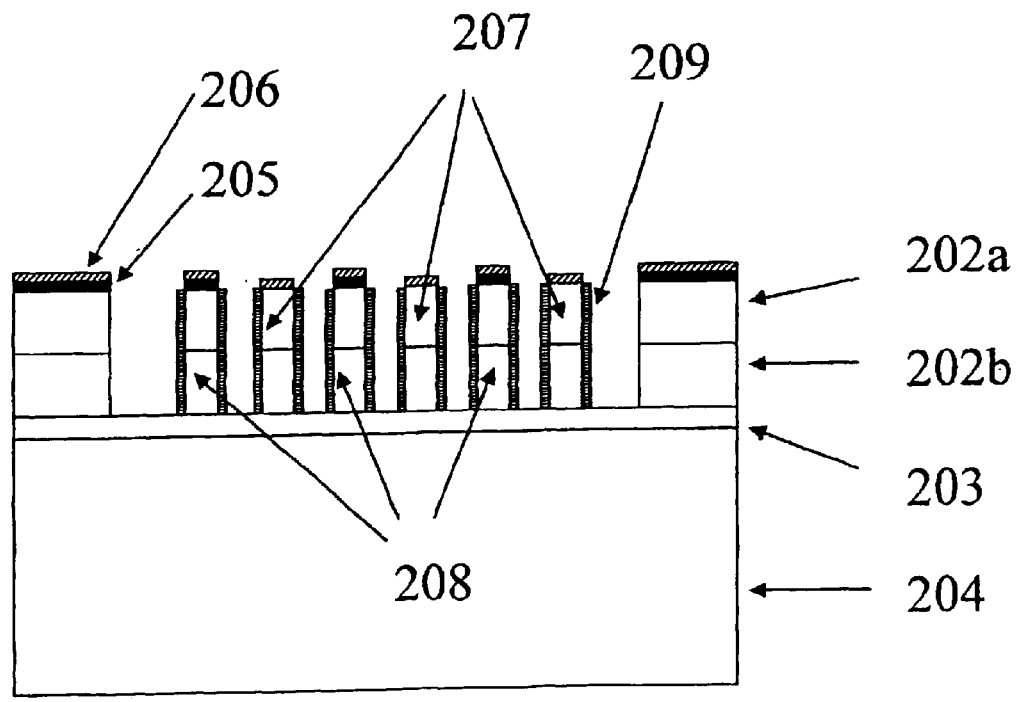
Figure 14G:
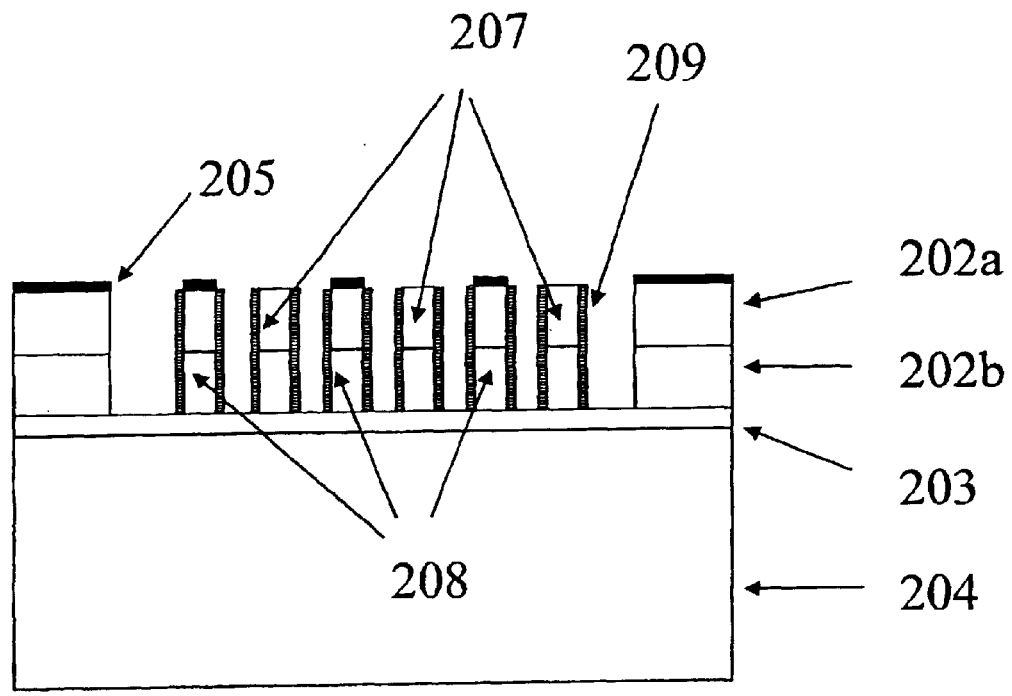
Figure 14H:
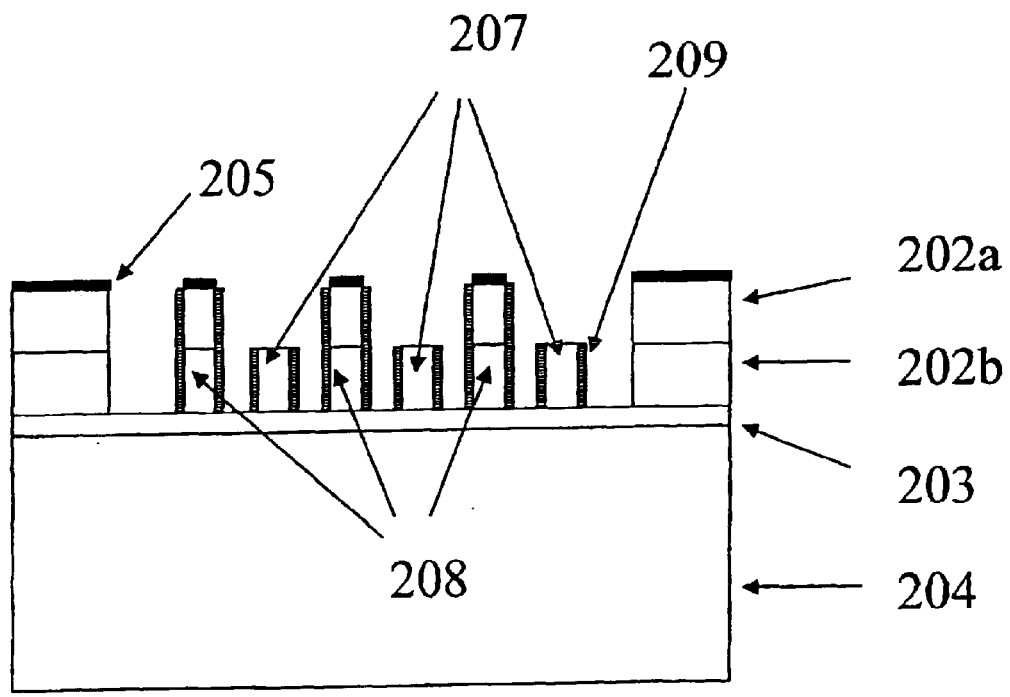

FIG. 14B shows a masking layer 205 such as silicon oxide, which protects a first comb-like structure that has a pn-structure during the etching of either a p-type layer or n-type layer of a second comb-like structure. This layer 205 is deposited on top of layer 202. Another masking layer 206 such as photoresist or silicon nitride is deposited on top of first masking layer 205 and patterned as shown in FIG. 14C. In order to eliminate or reduce misalignment effects, a first masking layer 205 has larger finger length and width in comparison to finger length and width of a second masking layer 206. Areas of first masking layer 205, which are not covered by a second masking layer 206 are selectively removed without affecting the second masking layer 206 as shown in FIG. 14D. A patterned masking layer 206 defines comb-like structures and misalignment between first 205 and second 206 masking layers has no impact on the comb finger width or gap between adjacent fingers. FIG. 14E shows a cross section view of a first 207 and second 208 comb fingers after etching layer 202 in the areas that have no masking protection. As shown in FIG. 14F, a third masking layer 209 is deposited or grown on the comb finger sidewalls in order to protect them during the next etch step. For example, a third masking layer 209 such as silicon oxide can be thermally grown on the sidewalls. In this case, the masking layers 205 and 206 should be compatible with the third masking process. The masking layer 206 is selectively removed as shown in FIG. 14G using appropriate etch techniques without impacting masking layers 205 and 209. A wet etch process such electrochemical KOH etch process can be used to selectively remove a non-masked layer 202a of first comb fingers 207 as shown in FIG. 14H.

Figure 14I:
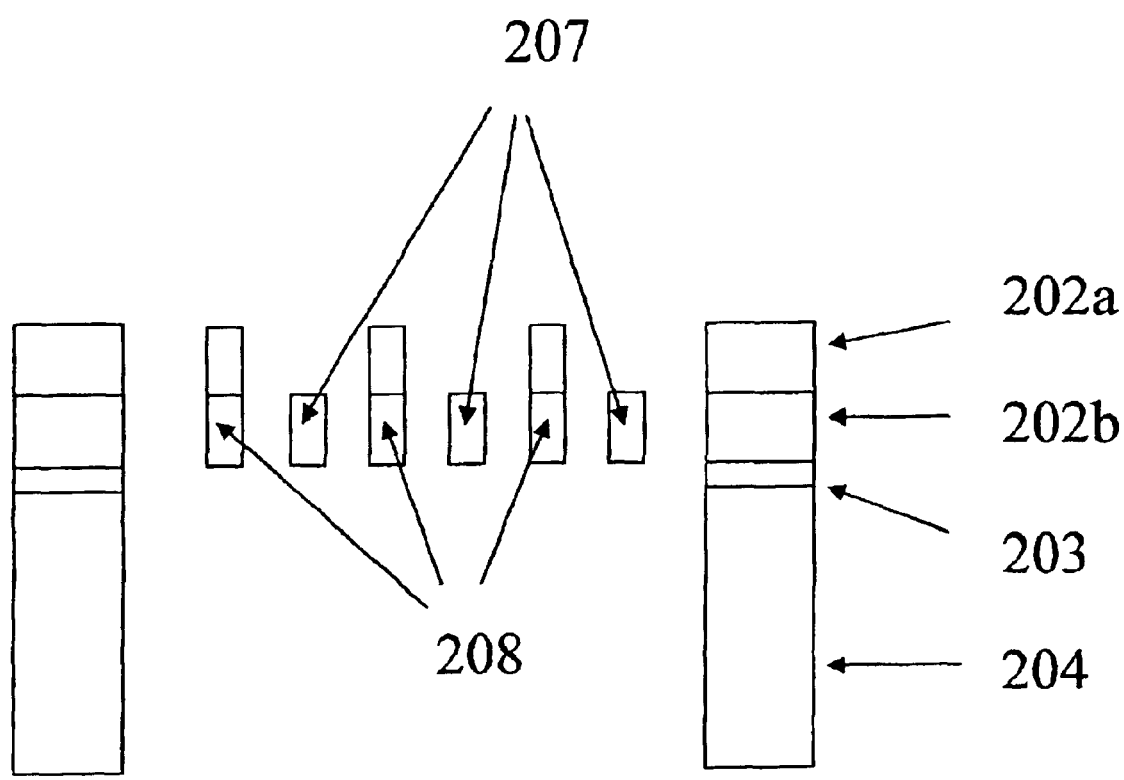

In an electrochemical KOH etch process, one layer 202b is biased in order to protect it during the etch process of a second layer 202a. The remaining masking layers 205 and 209, the optional insulating layer 203 and portion of the optional substrate 204 are removed as shown in FIG. 14I. In this case, the mobile comb-like structure can move below and above the substrate 104 surface. Whereas, if the substrate layer 204 is not removed, the mobile comb-like structure will be able to move only above the substrate 104 surface. This fabrication method can be used to make a pn-based vertical comb-drive actuator with a first comb-like structure that has pn-structure and a second comb-like structure that has a either a p-type layer or n-type layer removed.

A method for fabricating a micro-mirror system employing comb-drive actuators is now described. FIGS. 15A–15F show a schematic view of the fabrication process.

Figure 15A:
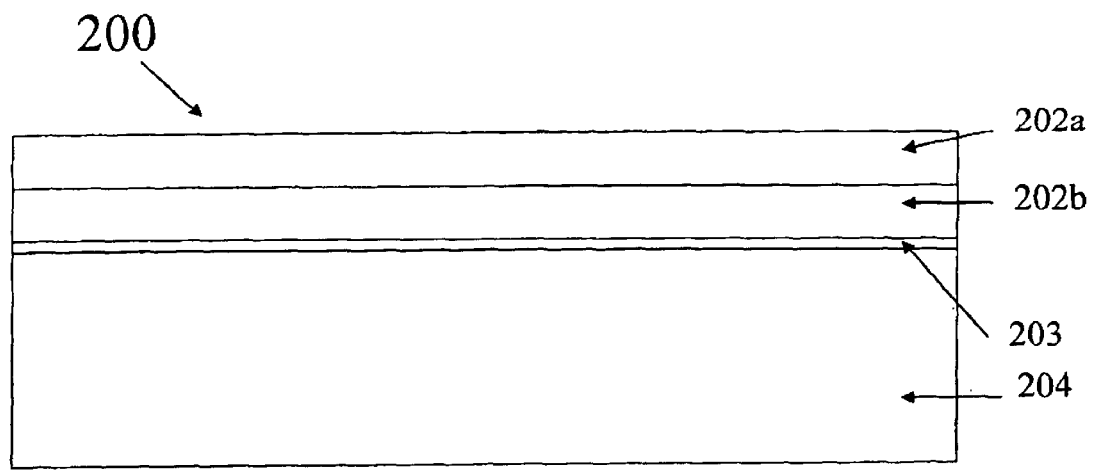
FIGS. 15A–15J show cross-section and perspective views of the fabrication process of a micro-mirror system employing pn-based, multi-gap, and variable-gap comb-drive actuators in accordance with another embodiment of the invention.

FIG. 15A shows a cross section view 200 of a substrate that has a first conducting and/or semiconducting layer 202, an optional second insulating layer 203, and an optional substrate 204.

Layer 202 can be single crystalline silicon and may consist of a p-type layer 202a on top of a n-type layer 202b. Insulating layer 203 is preferably thermally grown silicon oxide. Substrate layer 204 can be silicon.

Figure 15B:
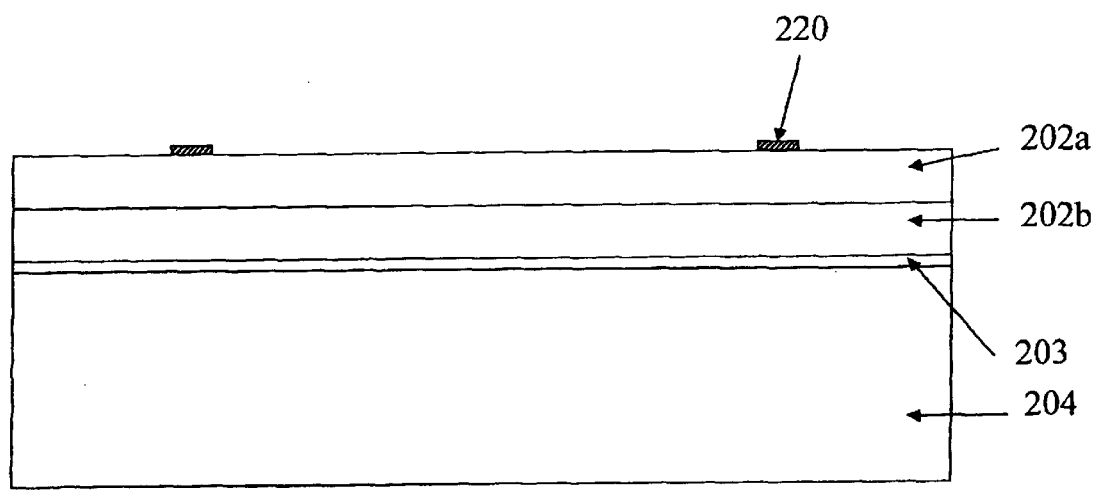
Figure 15C:
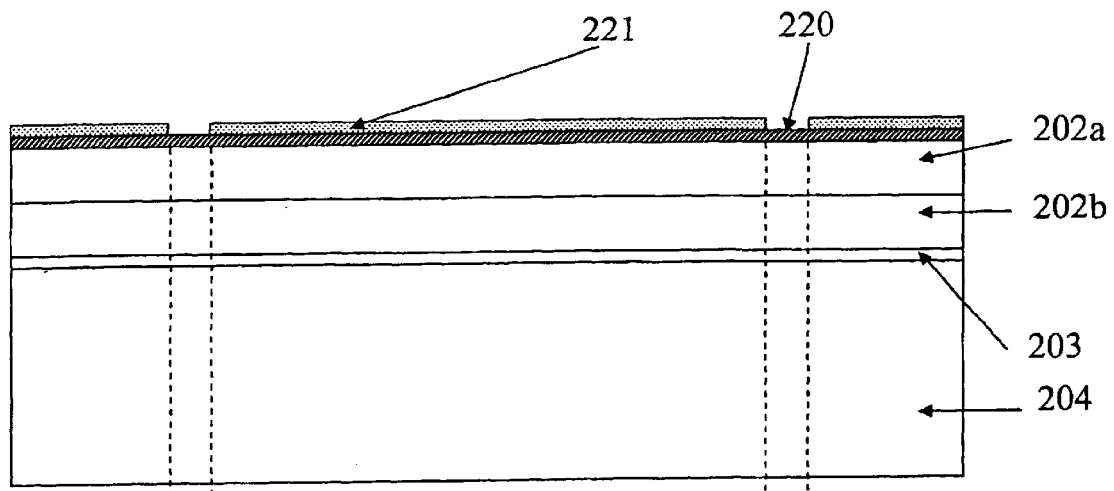
Figure 15D:
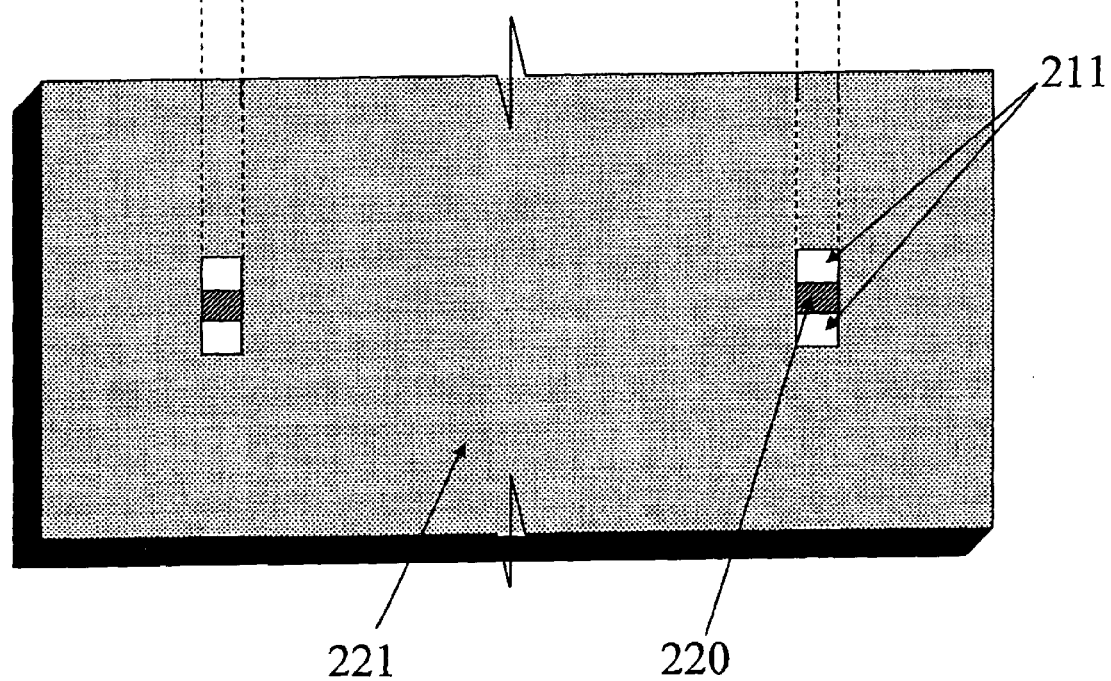
Figure 15E:
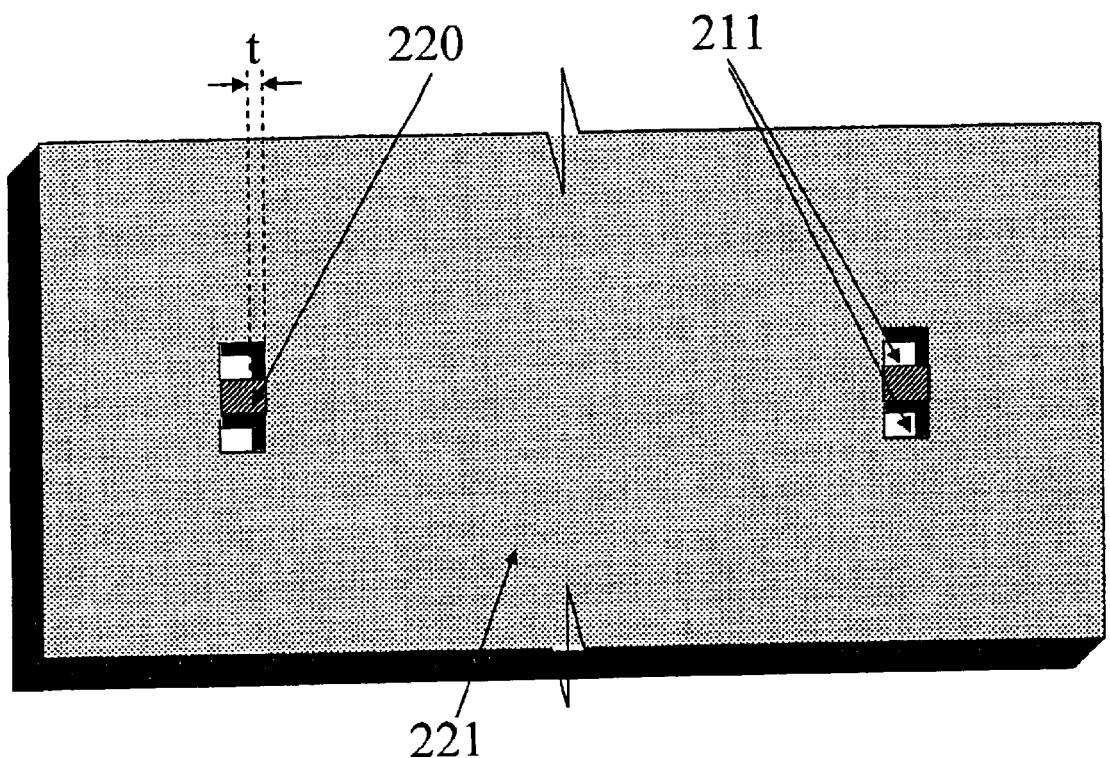
Figure 15F:
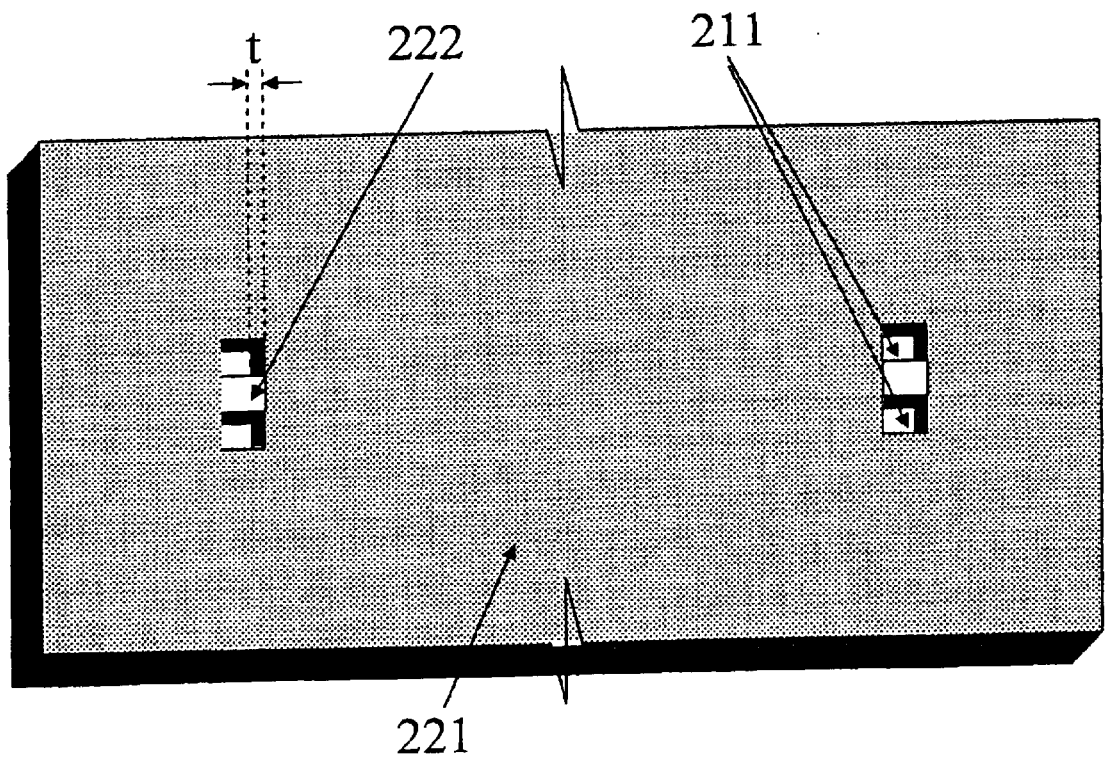
Figure 15G:
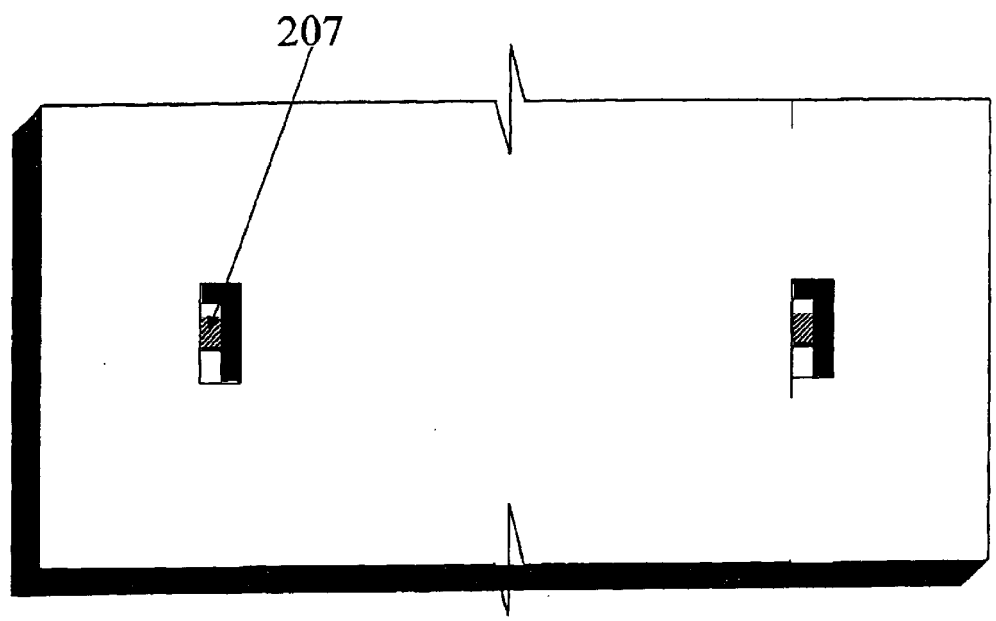
Figure 15H:
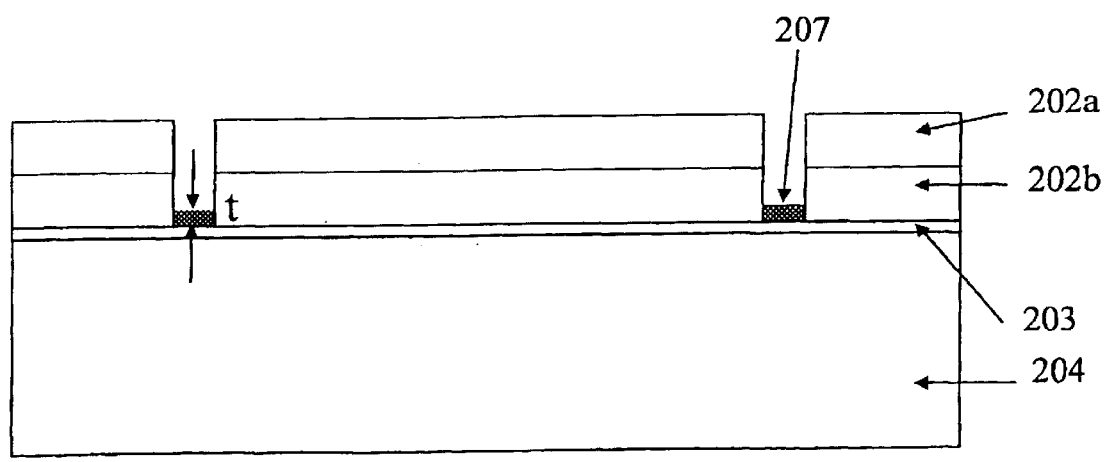
Figure 15I:
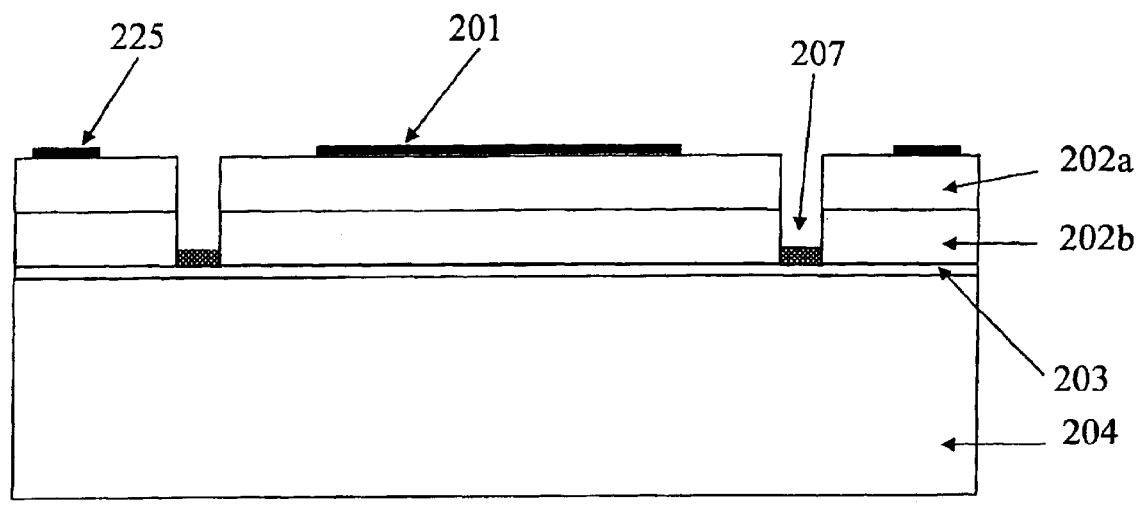
Figure 15J:
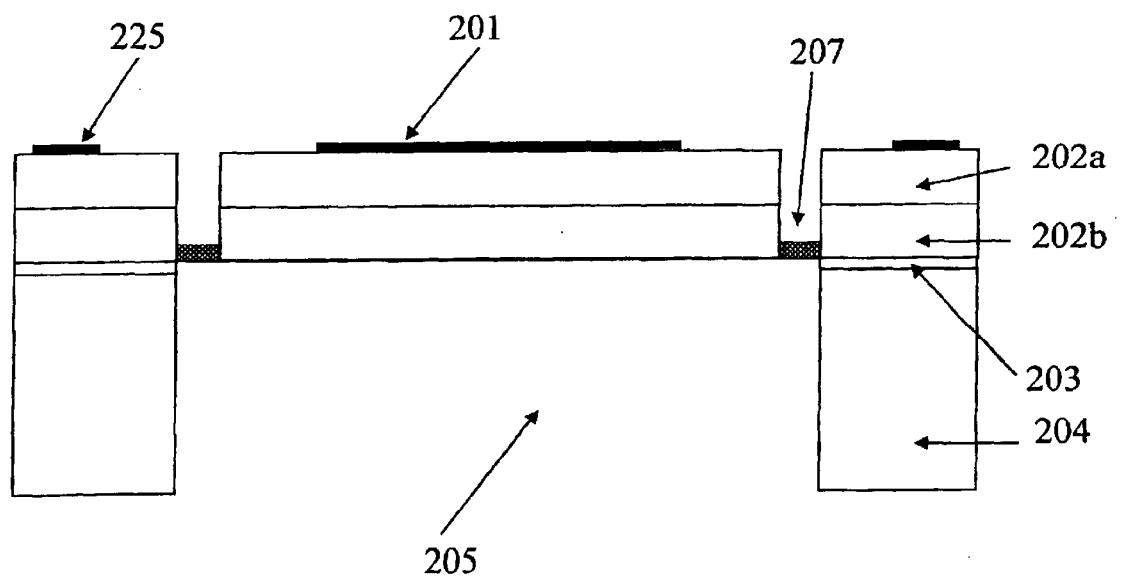

FIG. 15B shows a masking layer 220 such as silicon oxide, which protects a flexure during the etching of two cavities that define the flexure width. This layer 220 is deposited on top of layer 202 and patterned as shown in FIG. 15B. Another masking layer 221 such as photoresist or silicon nitride is deposited on top of first masking layer 220 and patterned as shown in FIGS. 15C–15D. This pattern may include the comb-drive actuator pattern (not shown in FIGS. 15C–15D) described in fabrication steps of FIGS. 13A–13E and FIGS. 14A–14I. Alternatively, comb-drive actuators may be fabricated after realizing the flexures. FIG. 15D shows a plan view of both masking layers 220 and 221 that define the cavities' patterns 211. Layer 202 is partially etched to a depth t in the areas that have no masking protection 211 as shown in FIG. 15E. After that, exposed masking layer 220 is selectively removed without affecting the second masking layer 221 as shown in FIG. 15F. Exposed areas 211 and 222 are then etched until layer 202 is completely removed in areas 211 and the masking layer 221 is subsequently removed as shown in FIG. 15G using appropriate etch techniques. As shown in FIG. 15H, the thickness of the remaining part of layer 202 in areas 222 is equal to t, which is the flexure 207 thickness. The contact pads 225 and the mirror 201 are then deposited and patterned as shown in FIG. 15I. For example, deposition techniques such as sputtering and e-beam evaporation may be used. The optional insulating layer 203 and portion of the optional substrate 204 are then removed as shown in FIG. 15J.

These fabrication methods can be used to make uni-axial and multi-axial actuators such as multi-gap, variable-gap, pn-based comb-drive actuators and combinations of two or more of these actuators. In addition, uni-axial and multi-axial micro-mirror systems employing comb-drive actuators disclosed herein can be made using these fabrication methods.

Uni-axial and multi-axial rotating actuators- and micro-mirror systems can be fabricated using various methods including, but not limited to, silicon surface micromachining, silicon bulk micromachining, LIGA, HEXSIL, electroforming of high aspect ratio structures, and combinations of two or more of these methods. In addition, other suitable fabrication methods of vertical comb-drive actuators known in the art can be used to make actuators disclosed herein. Some of these fabrication methods are disclosed in international patent publications WO 01/73934 A2, WO 01/73935 A2, WO 01/73936 A2, WO 01/73937 A2, WO 01/74707 A2 and WO 01/76055 A2 to Behin et al. and incorporated here herein by reference.

The uni-axial and multi-axial rotating actuators and position sensors disclosed herein have broad applications, including, but not limited to, telecommunication components such as fiber optical switches, switch arrays and optical crossconnects, optical devices for tracking and display, magnetic disk drives, inertial sensors, and biomedical components. Optical switch arrays employing uni-axial and/or bi-axial torsional micro-mirror systems can be used to construct fiber-optical crossconnects with large sizes, such as 1024×1024. The position sensors disclosed herein provide active and precise control of the micro-mirror's angle of rotation resulting in low insertion loss, which can be important in some crossconnects.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A comb-drive actuator, comprising:
   a plurality of interdigiated comb fingers wherein at least one of the comb fingers includes a p-type layer and an n-type layer for forming a depletion region.

2. The comb-drive actuator of claim 1, wherein the p-type layer contacts the n-type layer.

3. The comb-drive actuator of claim 1, wherein the at least one of the comb fingers further comprises an intrinsic layer between the p-type layer and the n-type layer.

4. The comb-drive actuator of claim 1, wherein the at least one of the comb fingers further comprises plural stacks of p-type and n-type layers.

5. The comb-drive actuator of claim 1, wherein the at least one of the p-type layer and n-type layer is graded.

6. The comb-drive actuator of claim 1, further comprising:
   means for varying the depth of the depletion region.

7. A comb-drive actuator, comprising:
   a stationary comb structure having a plurality of stationary comb fingers, wherein at least one of the stationary comb fingers includes a p-type layer and an n-type layer forming a diode junction;

a mobile comb structure having a plurality of mobile comb fingers cooperatively aligned with the stationary comb fingers, wherein at least one of the mobile comb fingers includes a p-type layer and an n-type layer forming a diode junction; and means for reverse biasing the diode junction of at least one comb finger selected from the group consisting of the at least one of the stationary comb fingers and the at least one of the mobile comb fingers.

8. The comb-drive actuator of claim 7, further comprising:

means for grounding either the p-type layer or the n-type layer of one or more comb fingers that are not reverse biased.

9. The comb-drive actuator of claim 7, wherein in mobile comb fingers and the stationary comb fingers, the p-type layer contacts the n-type layer.

10. The comb-drive actuator of claim 7, wherein the mobile comb fingers and the stationary comb fingers each further comprise an intrinsic layer between the p-type layer and the n-type layer.

11. The comb-drive actuator of claim 7, further comprising a position sensor for indicating the position of the mobile comb structure relative to the stationary comb structure.

12. The comb-drive actuator of claim 11, wherein the position sensor measures capacitance between at least one mobile comb finger and at least one stationary comb finger.

13. The comb-drive actuator of claim 7, wherein the mobile comb fingers and the stationary comb fingers are shaped to provide a multi-gap configuration between the mobile comb structure and the stationary comb structure.

14. The comb-drive actuator of claim 7, wherein the mobile comb fingers and the stationary comb fingers are shaped to provide a variable-gap configuration between the mobile comb structure and the stationary comb structure.

15. The comb-drive actuator of claim 7, wherein the at least one of the comb fingers further comprises plural stacks of p-type and n-type layers.

16. The comb-drive actuator of claim 7, wherein the at least one of the p-type layer and n-type layer is graded.

17. The comb-drive actuator of claim 7, further comprising:

means for varying the reverse bias.

18. A system, comprising:

a substrate;

a rotatable element capable of rotating about an axis;

a flexure aligned along the axis and mechanically engaging the substrate; and a comb-drive actuator for rotating the rotatable element, including a rotatable comb finger structure aligned with the axis and having one end attached to the rotatable element and another end attached to the flexure, the rotatable comb finger structure including a plurality of rotatable comb fingers, and a stationary comb finger structure attached to the substrate and having a plurality of stationary comb fingers interdigiated with the mobile comb fingers.

19. The system of claim 18, further comprising:

a second comb-drive actuator for rotating the rotatable element, including a second rotatable comb finger structure having one end attached to the rotatable element and the other end free, the second rotatable comb finger structure including a plurality of second rotatable comb fingers, and a second stationary comb finger structure attached to the substrate and having a plurality of second stationary comb fingers interdigiated with the second mobile comb fingers.

20. The system of claim 18, wherein at least one of the rotatable comb fingers includes a p-type layer and an n-type layer forming a diode junction.

21. The system of claim 20, further comprising:

means for reverse biasing the diode junction.

22. The system of claim 20, further comprising:

means for grounding at least one of the p-type layer and the n-type layer.

23. The system of claim 18, wherein at least one of the stationary comb fingers includes a p-type layer and an n-type layer forming a diode junction.

24. The system of claim 23, further comprising:

means for reverse biasing the diode junction.

25. The system of claim 24, further comprising:

means for varying the reverse bias.

26. The system of claim 23, further comprising:

means for grounding at least one of the p-type layer and the n-type layer.

27. The system of claim 18, further comprising a position sensor for indicating the position of the rotatable comb structure relative to the stationary comb structure.

28. The system of claim 27, wherein the position sensor measures capacitance between at least one rotatable comb finger and at least one stationary comb finger.

29. The system of claim 18, wherein the rotatable comb fingers and the stationary comb fingers are shaped to provide a multi-gap configuration between the rotatable comb structure and the stationary comb structure.

30. The system of claim 18, wherein the rotatable comb fingers and the stationary comb fingers are shaped to provide a variable-gap configuration between the rotatable comb structure and the stationary comb structure.

31. The system of claim 18, wherein the at least one of the comb fingers further comprises plural stacks of p-type and n-type layers.

32. The system of claim 18, wherein the at least one of the p-type layer and n-type layer is graded.

33. A method of operating a comb-drive actuator, comprising:

providing a stationary comb structure having a plurality of stationary comb fingers, wherein at least one of the stationary comb fingers includes a p-type layer and an n-type layer forming a stationary diode junction;

providing a mobile comb structure having a plurality of mobile comb fingers cooperatively aligned and interdigiated with the stationary comb fingers, wherein at least one of the mobile comb fingers includes a p-type layer and an n-type layer forming a mobile diode junction;

reverse biasing the stationary diode junction; and grounding at least one of the p-type layer and n-type layer of the mobile comb fingers.

34. The method of claim 33, further comprising:

measuring the capacitance between at least one mobile comb finger and at least one stationary comb finger to determine the position of the mobile comb structure relative to the stationary comb structure.

35. A method of manufacturing a comb-drive actuator, comprising:

providing a substrate;

forming an insulating layer on the substrate;

forming an first-type layer over the insulating layer;

forming a second-type layer over the first-type layer;

applying a masking layer on the second-type layer that defines a comb-drive actuator having a plurality of stationary fingers interdigiated with a plurality of mobile fingers;

etching away portions of the first-type layer and second-type layer not covered by the masking layer;

removing the masking layer; and removing the insulating layer from at least beneath the comb-drive actuator.

36. The method of claim 35, wherein the first-type layer is an n-type layer and the second-type layer is a p-type layer.

37. The method of claim 35, wherein the first-type layer is an p-type layer and the second-type layer is an n-type layer.

38. A method of manufacturing a comb-drive actuator, comprising:

providing a substrate;

forming an insulating layer on the substrate;

forming an first-type layer over the insulating layer;

forming a second-type layer over the first-type layer;

applying a first masking layer on the second-type layer to define a first plurality of comb fingers included in a comb-drive actuator;

applying a second masking layer over the first masking layer and over the second-type layer to define a second plurality of comb fingers included in the comb-drive actuator;

etching away portions of the first-type layer and second-type layer not covered by the first and second masking layers;

applying a third masking layer to the sidewalls of the first and second pluralities of comb fingers;

removing the second masking layer;

etching away portions of the second layer not covered by the first masking layer;

removing the first and third masking layers; and removing the insulating layer from at least beneath the comb-drive actuator.

39. The method of claim 38, wherein the first-type layer is an n-type layer and the second-type layer is a p-type layer.

40. The method of claim 38, wherein the first-type layer is an p-type layer and the second-type layer is an n-type layer.

* * * * *